(12) United States Patent
Neumann et al.

(10) Patent No.: US 12,175,650 B2
(45) Date of Patent: Dec. 24, 2024

(54) PROCESSING IMAGE DATA SETS

(71) Applicant: Carl Zeiss SMT GmbH, Oberkochen (DE)

(72) Inventors: Jens Timo Neumann, Aalen (DE); Abhilash Srikantha, Neu-Ulm (DE); Christian Wojek, Aalen (DE); Thomas Korb, Schwaebisch Gmuend (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 509 days.

(21) Appl. No.: 17/388,589

(22) Filed: Jul. 29, 2021

(65) Prior Publication Data

US 2021/0358101 A1    Nov. 18, 2021

Related U.S. Application Data

(63) Continuation of application No. PCT/EP2020/052380, filed on Jan. 31, 2020.

(30) Foreign Application Priority Data

Jan. 31, 2019 (DE) .......................... 102019102484.6

(51) Int. Cl.
*G06T 7/00* (2017.01)
*G06F 16/55* (2019.01)
(Continued)

(52) U.S. Cl.
CPC ............ *G06T 7/0004* (2013.01); *G06F 16/55* (2019.01); *G06F 18/2155* (2023.01);
(Continued)

(58) Field of Classification Search
CPC ..... G06T 7/0004; G06T 7/0006; G06T 7/001; G06T 7/344; G06T 2200/04;
(Continued)

(56) References Cited

U.S. PATENT DOCUMENTS

2007/0262988 A1* 11/2007 Christensen ............ G06T 15/08
345/424
2009/0080759 A1* 3/2009 Bhaskar .................. G06T 7/001
382/141

(Continued)

FOREIGN PATENT DOCUMENTS

WO   WO 2010/023580 A1    3/2010

OTHER PUBLICATIONS

Maruo, K., Shibata, T., Yamaguchi, T., Ichikawa, M., & Ohmi, T. (1999). Automatic defect pattern detection on LSI wafers using image processing techniques. IEICE Transactions on Electronics, 82(6), 1003-1012 (Year: 1999).*

(Continued)

*Primary Examiner* — Ping Y Hsieh
*Assistant Examiner* — Vaisali Rao Koppolu
(74) *Attorney, Agent, or Firm* — Fish & Richardson P.C.

(57) ABSTRACT

A method includes obtaining an image data set that depicts semiconductor components, and applying a hierarchical bricking to the image data set. In this case, the bricking includes a plurality of bricks on a plurality of hierarchical levels. The bricks on different hierarchical levels have different image element sizes of corresponding image elements.

24 Claims, 14 Drawing Sheets

(51) Int. Cl.
*G06F 18/20* (2023.01)
*G06F 18/214* (2023.01)
*G06N 20/00* (2019.01)
*G06T 7/33* (2017.01)
*G06V 30/24* (2022.01)

(52) U.S. Cl.
CPC ........... *G06F 18/285* (2023.01); *G06N 20/00* (2019.01); *G06T 7/0006* (2013.01); *G06T 7/001* (2013.01); *G06T 7/344* (2017.01); *G06V 30/2504* (2022.01); *G06T 2200/04* (2013.01); *G06T 2207/10061* (2013.01); *G06T 2207/20016* (2013.01); *G06T 2207/20021* (2013.01); *G06T 2207/20081* (2013.01); *G06T 2207/30148* (2013.01); *G06V 30/2528* (2022.01); *G06V 2201/06* (2022.01)

(58) Field of Classification Search
CPC . G06T 2207/10061; G06T 2207/20016; G06T 2207/20021; G06T 2207/20081; G06T 2207/30148; G06F 16/55; G06F 18/2155; G06F 18/285; G06N 20/00; G06V 30/2504
See application file for complete search history.

(56) References Cited

U.S. PATENT DOCUMENTS

| | | | | |
|---|---|---|---|---|
| 2009/0295800 | A1* | 12/2009 | Vetter | G06T 15/08 345/424 |
| 2011/0142321 | A1* | 6/2011 | Huffman | H04N 21/8146 382/131 |
| 2012/0002899 | A1 | 1/2012 | Orr, IV et al. | |
| 2014/0341462 | A1* | 11/2014 | Sezginer | G03F 7/7065 382/149 |
| 2018/0226283 | A1* | 8/2018 | Amanullah | G01B 11/245 |
| 2019/0188840 | A1* | 6/2019 | Kwon | G06V 10/764 |

OTHER PUBLICATIONS

Maruo, K., Shibata, T., Yamaguchi, T., Ichikawa, M., & Ohmil, T. (1999). Automatic defect pattern detection on LSI wafers using image processing techniques. IEICE Transactions on Electronics, 82(6), 1003-1012 (Year: 1999).*

Yang, W., Dai, D., Triggs, B., & Xia, G. S. (2012). SAR-based terrain classification using weakly supervised hierarchical Markov aspect models. IEEE Transactions on Image Processing, 21(9), 4232-4243 (Year: 2012).*

Maruo K. et al.: "Automatic Defect Pattern Detection on LSI Wafers Using Image Processing Techniques", IEICE Transactions on Electronics, Institute of Electronics, Tokyo, Jun. 1, 1999.

Wen Yang et al.: "SAR-Based Terrain Classification Using Weakly Supervised Hierarchical Markov Aspect Models", IEEE Transactions on Image Processing, IEEE Service Center, Piscataway, NJ, Sep. 1, 2012.

Chang, M-C et al.: "Fast Search Algorithms for Industrial Inspection", International Journal of Pattern Recognition and Artificial Intelligence, World Scientific Publishing, Jun. 1, 2001.

Shankar, N.G.; Zhong, Z.W.; Ravi, N.: "Classification of Defects on Semiconductor Wafers Using Priority Rules" In: Defects and Diffusion Forum, vol. 230-232, 2004.

Cerri, R. et al.: "Hierarchical Multi-Label Classification using Local Neural Networks", Journal of Computer and System Sciences, vol. 80, 2014.

Translation of International Search Report and Written Opinion of corresponding PCT Appl No. PCT/EP2020/052380, dated Apr. 24, 2020.

Nickolay, B. et al.: "Automated visual inspection on the basis of a hierarchical image resolution", ZWF Magazine for Economical Manufacturing and Automation, Carl Hanser Verlag, München, DE, Jan. 1, 1992.

Korean Notice of Preliminary Rejection/Non-Final Office Action, with translation thereof, for corresponding KR Appl No. 10-2021-7027289, dated Mar. 19, 2024.

\* cited by examiner

PROCESSING IMAGE DATA SETS

CROSS-REFERENCE TO RELATED APPLICATIONS

This application is a continuation of, and claims priority under 35 U.S.C. § 120, to international application PCT/EP2020/052380, filed Jan. 31, 2020, which claims benefit under 35 U.S.C. § 119 of German patent application 10 2019 102 484.6, filed Jan. 31, 2019. The entire contents of both applications are incorporated by reference herein.

FIELD

Various examples of the disclosure relate generally to the processing of two- or three-dimensional image data sets. Various examples of the disclosure relate for example to applying a hierarchical bricking to the two- or three-dimensional image data set.

BACKGROUND

During the fabrication of semiconductor components, it is often desirable to monitor the wafer processing in order to recognize defects, to reduce rejects and to lower process costs. Anomalies can be identified. Metrology, i.e. the measurement of specific geometric properties of structures of the semiconductor components on the wafer (for instance width, length or diameter), is made possible.

Owing to larger wafer diameters and smaller structure sizes, the number of structures on a wafer (or alternatively on a typical chip) can be particularly large. The processing of correspondingly high-resolution image data sets can therefore be complex and memory-intensive.

For example, three-dimensional (3-D) image data sets are known, for instance as a result of X-ray imaging or a combined technique including a focused ion beam for sample preparation and scanning electron microscopy (FIB-SEM microscope). Such 3-D image data sets can be particularly large (i.e. have many voxels) and generally can be processed only particularly time-intensively using conventional techniques.

SUMMARY

The disclosure seeks to provide improved techniques for processing image data sets, for example 3-D image data sets, that depict semiconductor components. For example, the disclosure seeks to provide techniques which enable the processing of large image data sets having many image elements.

In an aspect, the disclosure provides a method that includes obtaining an image data set. The image data set depicts semiconductor components. The method also includes applying a hierarchical bricking to the image data set. The bricking includes a plurality of bricks on a plurality of hierarchical levels. Bricks of different hierarchical levels have different image element sizes of the corresponding image elements.

Depending on the dimensionality of the image data set—that is to say 3-D or two-dimensional (2-D)—the dimensionality of the bricks can also vary.

Applying the hierarchical bricking to the image data set can correspond to decomposing the image data set into bricks on the plurality of hierarchical levels and in accordance with the bricking. The bricking can thus correspond to a rule for decomposing into the bricks.

In an aspect, the disclosure provides a computer program or a computer program product or a computer-readable storage medium that includes a program code. The program code can be loaded and executed by a processor. This causes a method to be carried out. The method includes obtaining an image data set. The image data set depicts semiconductor components, for example also components within an integrated circuit. The method also includes applying a hierarchical bricking to the image data set. The bricking includes a plurality of bricks on a plurality of hierarchical levels. Bricks of different hierarchical levels have different image element sizes.

In an aspect, the disclosure provides a processor configured to load program codes from a memory and to execute them. This causes a method to be carried out. The method includes obtaining an image data set. The image data set depicts semiconductor components. The method also includes applying a hierarchical bricking to the image data set. The bricking includes a plurality of bricks on a plurality of hierarchical levels. Bricks of different hierarchical levels have different image element sizes.

The features set out above and features that are described below may be used not only in the corresponding combinations explicitly set out, but also in further combinations or in isolation, without departing from the scope of protection of the present disclosure.

DETAILED DESCRIPTION OF EMBODIMENTS

Figure 1:
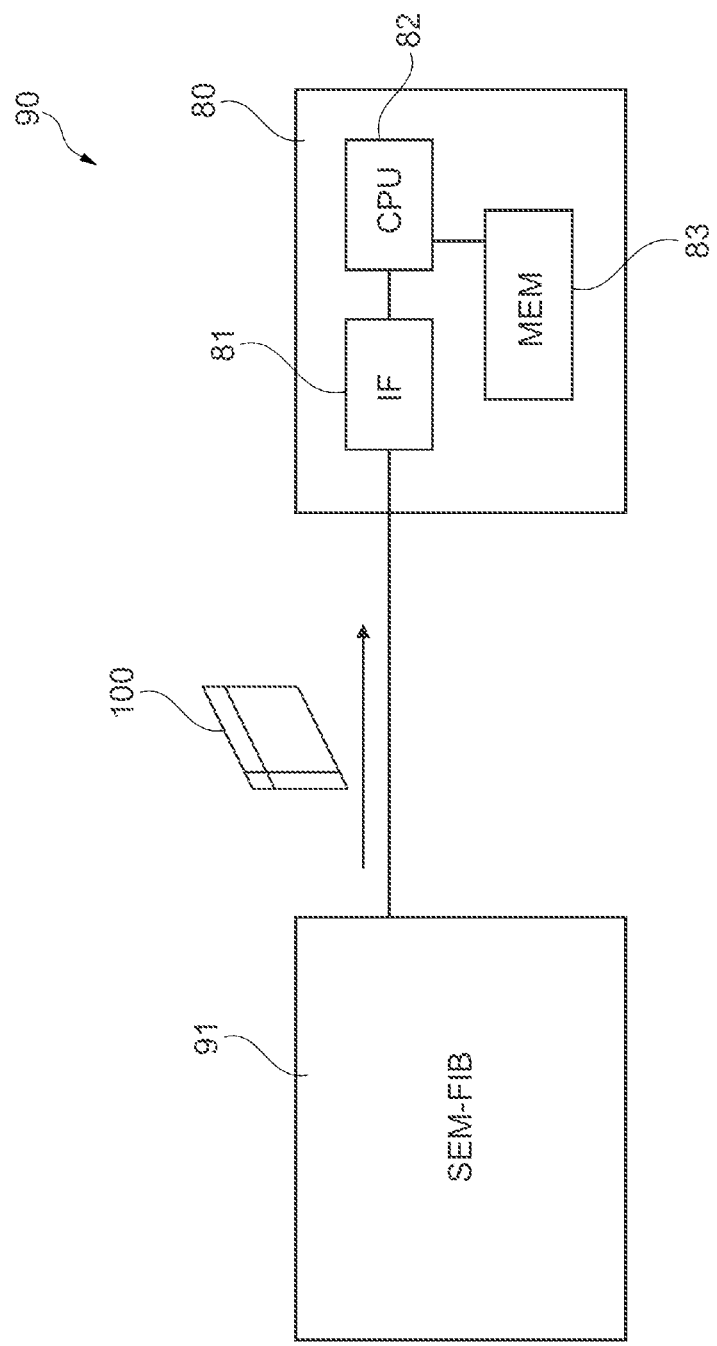
FIG. 1 schematically illustrates a system including an imaging unit and a computing unit in accordance with various examples.

Certain properties, features and advantages of this disclosure described above and the way in which they are achieved will become clearer and more clearly understood in association with the following description of the exemplary embodiments which are explained in greater detail in association with the drawings.

The present disclosure is explained in greater detail below on the basis of preferred embodiments with reference to the drawings. In the figures, identical reference signs denote identical or similar elements. The figures are schematic representations of various embodiments of the disclosure. Elements illustrated in the figures are not necessarily illustrated as true to scale. Rather, the various elements illustrated in the figures are rendered in such a way that their function and general purpose become comprehensible to the person skilled in the art. Connections and couplings between functional units and elements as illustrated in the figures can also be implemented as an indirect connection or coupling. A connection or coupling can be implemented in a wired or wireless manner. Functional units can be implemented as hardware, software or a combination of hardware and software.

Techniques in association with the processing of image data sets are described below.

In general, a wide variety of types of image data sets can be processed with the techniques described herein. By way of example, two-dimensional (2-D) image data sets could be processed. However, 3-D image data sets can also be processed. In the case of 2-D image data sets the image elements are formed by pixels, and in the case of 3-D image data sets the image elements are formed by voxels.

The techniques described below are described primarily in association with 3-D image data sets, although corresponding techniques can also be applied, mutatis mutandis, to 2-D image data sets.

The 3-D image data set can have an extent in all three spatial dimensions. This means that the 3-D image data set can include a plurality of voxels. A voxel can be described as the 3-D equivalent of a 2-D pixel. The voxel and the pixel are image elements. A voxel can have a specific contrast that is indicative of the spatial region depicted by the voxel. A voxel has three sides having specific edge lengths. For example, the voxels in the various examples described herein can have different edge lengths, e.g. in the range of nm to mm.

The techniques described herein can be used in various fields of application. In general, various types of structures can be depicted by the 3-D image data set. By way of example, it would be possible for the 3-D image data set to depict organic samples (for example in light-sheet microscopy), the anatomy of a patient (in computed tomography imaging or magnetic resonance imaging), workpieces (non-destructive X-ray imaging for instance when checking turbine blades, etc.), radar measurements, or else semiconductor components (for instance FIB-SEM imaging or X-ray imaging). Hereinafter, for reasons of simplicity, reference is made primarily to 3-D image data sets that depict semiconductor components. However, the corresponding techniques can also be applied to other fields of application. A 2-D image data set can be obtained e.g. with a scanning electron microscope (SEM).

Semiconductor components can be selected e.g. from the following groups: memory groups; memory cells; transistors; gate; logic gates; vias; interconnects; chips; dies; "die streets"; transistor contacts such as gate, source, drain; trenches or holes; etc. Depending on the field of application, various imaging methods (imaging modality) can be used for acquiring the image data set. In the case of a 2-D image data set, for example, a multibeam SEM (mSEM) could be used. In the case of a 3-D image data set, for instance, FIB-SEM imaging could be used in the case of semiconductor components. Such methods and other methods for acquiring image data sets are known in principle. Examples include for example bright field inspection. SEM imaging is possible. Tunneling electron microscope (TEM) lamellae can be prepared and imaged. The techniques described herein can be combined with the various imaging methods.

Various examples are based on the insight that a suitable structuring of the image data set as input data for a processing algorithm can foster the efficient processing of the image data set. A suitable structuring of the image data set can also enable the logical combination of structures of the image data set. In this way, defects can be better found and classified. Moreover, the techniques described herein can foster navigating through an image data set by virtue of the fact that—via the hierarchical bricking—context information about the position of a corresponding structure depicting part of a semiconductor component can in each case be indicated in a complex architecture of one or more semiconductor components. Moreover, it may be possible to find specific semiconductor components in a targeted manner, by zooming using the hierarchical bricking.

Typical 3-D image data sets can include for example a number of 6000×6000×1000 voxels. In general, the number of voxels within the meaning of the present description can describe the number of voxels in a depicted 3-D volume (image volume). This means that the number of voxels can be equivalent to the number of pixels of a 2-D image. The number of voxels in the different spatial directions is referred to hereinafter as (A, B, C), for example. The total number of voxels in the data set is then ABC.

In accordance with various examples, a hierarchical bricking is applied to a 2-D or 3-D image data set. The bricking includes a plurality of hierarchical levels. Different bricks are allocated in different hierarchical levels. Bricks on different hierarchical levels have different image element sizes, i.e. different edge lengths of voxels or pixels.

The bricking can describe associations between the bricks. The bricking can be described e.g. by a tree structure. The tree structure can define a hierarchical arrangement of the bricks. In this case, a brick of a specific hierarchical level can include a plurality of bricks on a low hierarchical level; and can be included in a brick of a higher hierarchical level.

The bricks can depict 2-D or 3-D partial regions of an image volume (called "field of view") of the 2-D or 3-D image data set. Each brick can have a number of pixels or voxels of a specific size. The bricks could have different or identical edge lengths along the two or three spatial directions.

In general, the pixel size or voxel size correlates with a resolution/sampling with which structures can be represented. The pixel size or voxel size can be described by the edge length of a pixel or voxel in the different spatial directions. Typical edge lengths are e.g. in the range of nm to mm—depending on the respective hierarchical level where the corresponding brick is. In order to obtain different pixel sizes or voxel sizes, downsampling can be used. For example, the bricks on an upper hierarchical level can have a larger pixel size or voxel size than the bricks on a lower hierarchical level. This means in other words that the bricks on the lower hierarchical level can depict structures with greater detail or a higher resolution than the bricks on an upper hierarchical level. The pixel size or voxel size correlates with the minimum structure size visible or recognizable from a brick.

Downsampling generally describes the reduction of the resolution of an image data set. This means that the pixel size or voxel size is increased, for example by interpolating the pixels or voxels to a coarser grid, maintaining only every n-th pixel or voxel, or carrying out averaging.

By using the hierarchy of the bricking, a logical combination of structures having structure sizes corresponding to the image element sizes of the bricks on the different hierarchical levels can be made possible in an efficient manner. Moreover, efficient navigating through the image data set can be made possible. The navigating can be made possible e.g. by controlling a human-machine interface (HMI). The desired memory properties during navigating in the image data set can be limited: e.g. it is possible to keep in each case only relevant bricks in the main memory. For example, the pixels/voxels of a specific brick can be output to the user via the HMI; it would then be conceivable for all further bricks on lower hierarchical levels that are included within the brick already prospectively to be loaded into the main memory.

The following scenario is described as an example of navigating efficiently through the 3-D image data set: by way of example, the gate insulation for transistors in specific memory elements could be checked. For this purpose, it may be advantageous if, for example, such transistors having a possible defect (identified for example via a machine-learned algorithm) are visually output successively to the expert and a visual check can be carried out on the basis thereof. At the same time the context of the respective transistor can in each case be output, that is to say that, for example, the hierarchically higher semiconductor components are identified which include the respective transistor (that is to say e.g. die[7]-trench[3]-memory cell[5] etc.). On the basis of such information concerning the context of the respective transistor, it is possible firstly to ensure rapid retrievability of the defect. It is possible secondly to take account of the context of the respective transistor during checking in order for example to identify specific dependencies of a defect frequency on the context. The context can be provided or indicated by a multihierarchical label. Details with regard to annotating labels are described below.

By way of example, labels can be allocated to structures in different bricks. In general, a label denotes the logical classification of a structure. Different structure types can obtain different labels. In general, the structure types can include e.g. an overview of the semiconductor components, or parts of the semiconductor components (wherein parts of the semiconductor components can in turn be designated as independent semiconductor components, e.g. layer—trench—transistor—gate), or else other features, for instance lithography markers, defects, impurities, etc. A label can also indicate the position of a structure, for example via a bounding box or by segmentation at the voxel level. In general terms, therefore, that means that a label can also be used to indicate a positioned and spatially delimited region (e.g. via a bounding box with midpoint coordinate or corner coordinate or via segmentation with its centroid).

Annotation denotes the process of allocating labels to structures. Allocating labels to structures can be effected manually, partly automatically or fully automatically in the various examples. Allocating labels can include for example inheritance and/or propagation of labels between associated structures. By way of example, an object recognition or generally a classification can be used in the context of annotation.

Object recognition typically denotes the automated process of recognizing structures and providing labels with a suitable object recognition algorithm. A segmentation is also possible in the context of object recognition.

Classification typically denotes the formation of classes of comparable structures. Classes can be identified by a class representative. Structures which are comparable with the representative or have particularly high similarity in association with a predefined metric can be allocated to the corresponding class. Other structures not having such high similarity cannot be allocated to the class. Allocating labels can be made possible by the classification. The labels can describe for example the assignment to the different classes.

However, the bricking can be used not just for efficiently allocating labels. Alternatively or additionally, a registration of the image data set at a reference data set—for instance geometric reference data such as e.g. CAD files or overview images captured by an optical microscope—can also be made possible. Registration typically denotes removal of translational displacements and/or rotations and/or scaling between two data sets. The registration makes it possible to obtain an assignment between image elements of the first data set and the image elements of the second data set, wherein the size of the image elements in the two data sets can be different.

FIG. 1 schematically illustrates a system 90 in accordance with various examples. The system 90 includes an imaging device 91, in the example in FIG. 1 an FIB-SEM microscope. The latter can for example prepare tunneling electron microscope lamellae or generate a 3-D image data set 100 of a sample object by "slice and image" (sequentially removing layers by FIB and respectively acquiring an SEM image). The sample object could typically be a wafer or a chip, for example.

In general, various imaging devices 91 can be used. Some examples are illustrated in TAB. 1 below:

TABLE 1

Examples of imaging devices

| Type of imaging device 91 | Dimensionality of the acquired image data set | Notes for an exemplary characteristic |
|---|---|---|
| MultiSEM (mSEM) | 2-D | ≥1 cm2 area with ≤2 nm pixel size, depicted by 91 beams operating in parallel, resulting in 25 TPx. Applications: e.g. massive metrology and defect detection. |
| X-ray microscope (XRM) | 3-D: Reconstruction from 2-D projections of a sample rotated about an axis | Orders of magnitude: typical voxels have an edge length of 40 nm-a few 100 nm. A typical 3-D image data set consists of approximately $1000^3$ voxels. Applications: By way of example, the connections of finished |

TABLE 1-continued

Examples of imaging devices

| Type of imaging device 91 | Dimensionality of the acquired image data set | Notes for an exemplary characteristic |
|---|---|---|
| | | processed chips to their package or the connections of a plurality of chips among one another within a package are recorded. |
| SEM-FIB cross beam microscope Helium ion microscope (HIM) | 2D + 1D: Stack of 2D slices that are combined in post processing. In contrast to XRM and mSEM, there are various image channels here - secondary electrons released by incident electrons, secondary electrons released by incident ions, backscattered electrons, SIMS and possibly more. All image channels supply a dedicated voxelated image of the sample. | Orders of magnitude: Typical 2-D slices have pixel sizes of 2-4 nm over a cross section of a plurality of μm. Typical sample volumes are approximately 100 um$^3$ with less than 10 nm$^3$ voxel volume for logic or 200 um$^3$ with a few 10 nm$^3$ voxel volume for 3D memory applications |

An mSEM is a microscope that uses charged particles. For example, electrons are used. In this case, for example, a wafer is illuminated with an array of electron beams, for example with more than 40 or even more than 90 electron beams. This primary illumination can be scanned jointly over the sample object. It is thereby possible to obtain a particularly large image field by combination of signals which are caused by the various electron beams. The image is formed on the basis of secondary particles or secondary radiation emitted by the sample object on account of the primary illumination. The secondary particles or the secondary radiation can be present in the form of secondary electrons, backscattered electrons, X-ray radiation and/or luminescence radiation. The composition, energy and angle of the secondary radiation can be influenced by setting the energy of the primary radiation and is an indicator of the material composition and surface quality of the surface of the sample object. Typically, the aggregated image field is particularly large, for example in the range of 100 μm×100 μm or even of 120 μm×120 μm.

The image data set 100 is then transmitted to a computing unit 80. The computing unit 80 includes a communication interface 81 for receiving the image data set 100. Moreover, the computing unit 80 also includes a processor 82 and a memory 83. The processor 82 could include a CPU and/or a GPU for example. The processor 82 can load program codes from the memory 83 and execute them. The processor 82 can then carry out various methods described herein in association with the processing of the image data set. For example, the processor 82 could apply a hierarchical bricking to the image data set 100 on the basis of the program code.

While FIG. 1 illustrates a scenario in which the computing unit is embodied separately from the imaging device 91, they can also be provided in integrated fashion.

Figure 2:
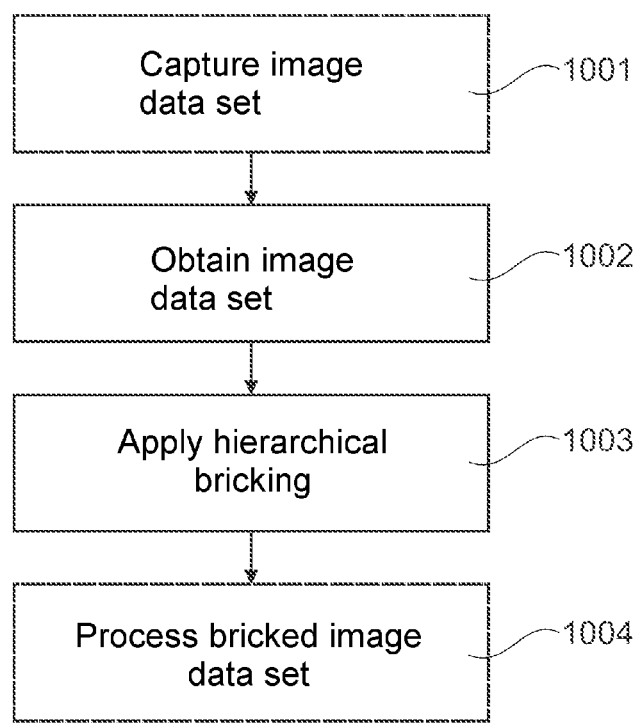
FIG. 2 is a flowchart of one exemplary method.

FIG. 2 is a flowchart of one exemplary method. The method in accordance with FIG. 2 can be carried out by a processor on the basis of program codes. For example, the method in accordance with FIG. 2 could be carried out by the processor 82 on the basis of a program code loaded from the memory 83. FIG. 2 illustrates optional blocks with dashed lines.

Firstly, acquiring an image data set is carried out in optional block 1001. By way of example, a 3-D image data set can be acquired. The latter depicts an image volume. The 3-D image data set includes a number of ABC-native voxels. A 2-D image data set depicting a specific image field could also be acquired.

Obtaining the image data set is then carried out in block 1002. Block 1002 can include a transmission (cf. FIG. 1). Block 1002 can be defined for example in association with a specific memory format, i.e. a specific container or format of data packets, in which the image data set is included.

Applying a hierarchical bricking to the image data set from block 1002 is then carried out in block 1003. In this case, a plurality of hierarchical levels are defined by the bricking. In this case, the information included in the image data set is structured in association with pixels or voxels that are included in bricks on the various hierarchical levels. The pixels or voxels of the various bricks can deviate from the native pixels or voxels of the 2-D or 3-D image data set.

In general, the memory format of the image data set before and after bricking need not necessarily correlate with the hierarchical bricking. For example, separate control data that implement the hierarchical bricking in association with the image data set could be created.

Each brick can include a specific number of image elements, i.e. number of pixels or number of voxels. By way of example, the bricks of the same hierarchical level can have the same number of image elements.

The image elements on an upper hierarchical level have a longer edge length than the image elements on a lower hierarchical level. That is to say that the image element size increases toward upper hierarchical levels.

The bricks on an upper hierarchical level include a plurality of bricks of a lower hierarchical level. That is to say that the edge length of the bricks increases toward upper hierarchical levels.

For example, it is possible to reproduce the sampling with the structures on the image elements of the upper hierarchical level, that is to say that the sampling can be lower than the native resolution of the image data set. This can involve averaging or some other technique of downsampling of information in the image data set in the context of block 1002 in order to obtain a contrast value for the image elements on upper hierarchical levels.

Figure 3:
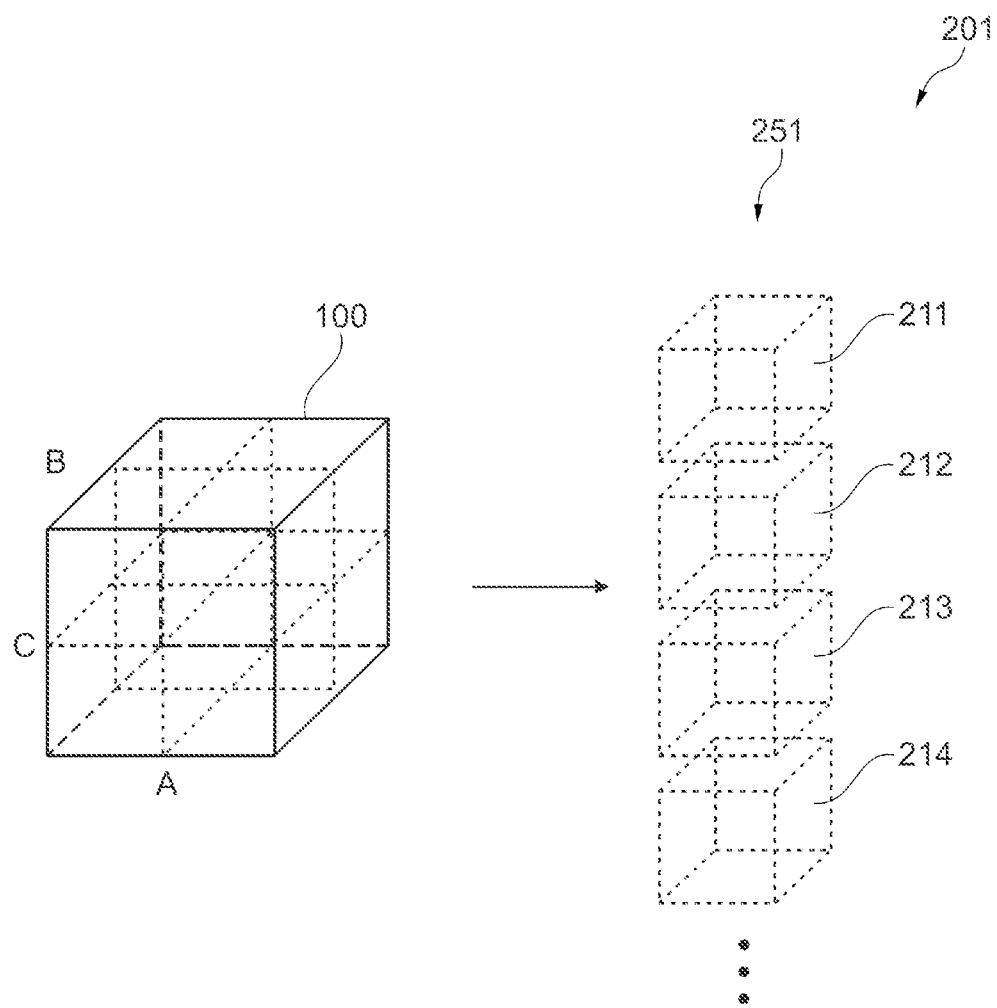
FIG. 3 illustrates applying a hierarchical bricking to a 3-D image data set in accordance with various examples.

A description is given below, in association with FIGS. 3, 4 and 5, of details concerning block 1003, i.e. concerning applying the bricking. For example, a 3-D image data set 100 is illustrated in FIG. 3 on the left. The image data set has a number of (A, B, C) voxels (the voxels are not represented in FIG. 3).

FIG. 3 illustrates on the right the bricking 201, specifically for example on the topmost hierarchical level 251. There are eight bricks 211-214 on the topmost hierarchical level of the bricking 201 (however, only four bricks 211-214 are illustrated on the right in FIG. 3 for reasons of simplicity, although the eight bricks are illustrated by dashed lines on the left in FIG. 3).

The decomposition of the image volume of the 3-D image data set 100 into eight bricks is only one example, however. Other edge lengths could also be used for the bricks 211-214.

FIG. 3 illustrates bricks 211-214 of the topmost hierarchical level 251. The decomposition can be continued toward lower hierarchical levels: FIG. 4 in turn illustrates a further decomposition of the brick 213 from hierarchical level 251. FIG. 4 shows that a brick 213-1 on the next lower hierarchical level 252 is defined as a partial volume of the (partial) volume of the brick 213.

Figure 4:
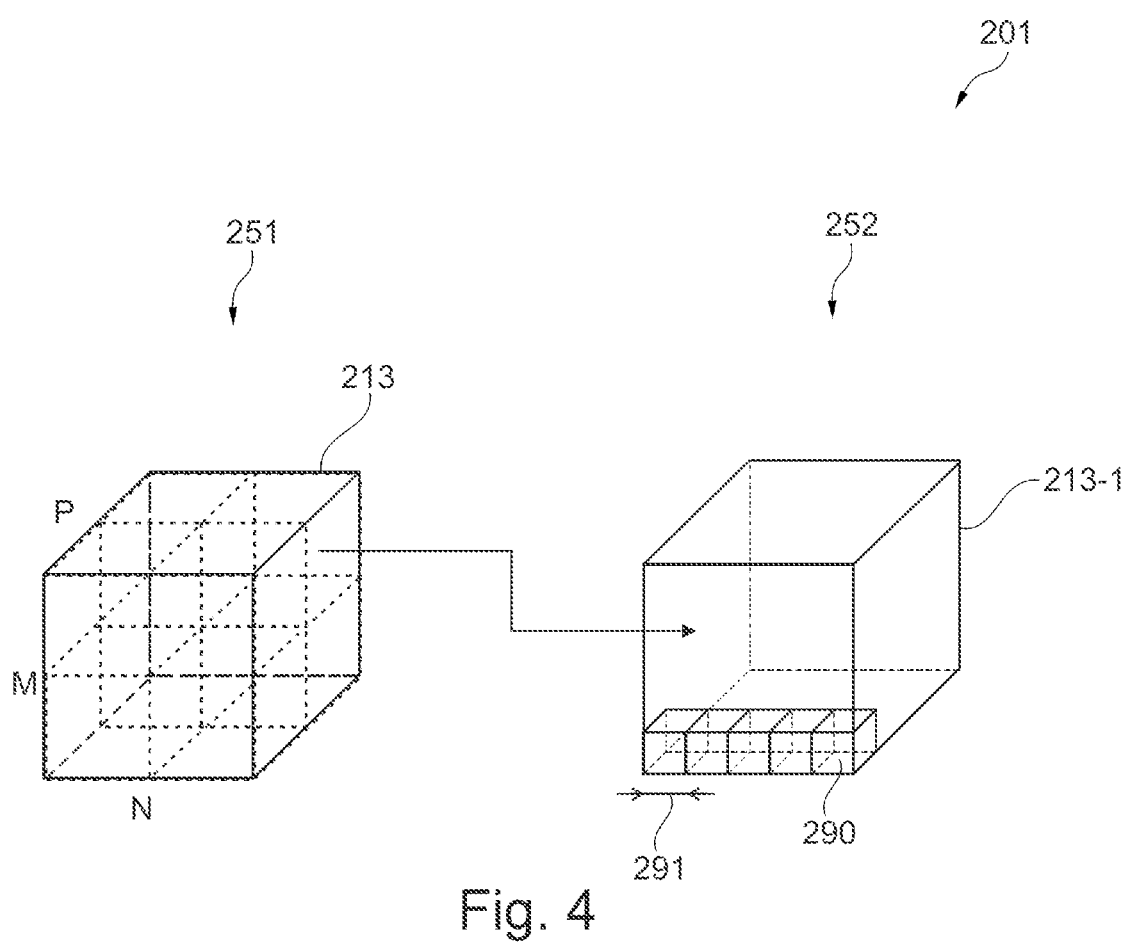
FIG. 4 illustrates applying a hierarchical bricking to a 3-D image data set in accordance with various examples.

FIG. 4 also illustrates that the brick 213-1 includes a number of voxels 290. The voxel size 291—here as edge length of the voxels 290—is also illustrated. The number of voxels per brick 213-1 can vary from hierarchical level to hierarchical level 251, 252 or can also be chosen to be constant.

Figure 5:
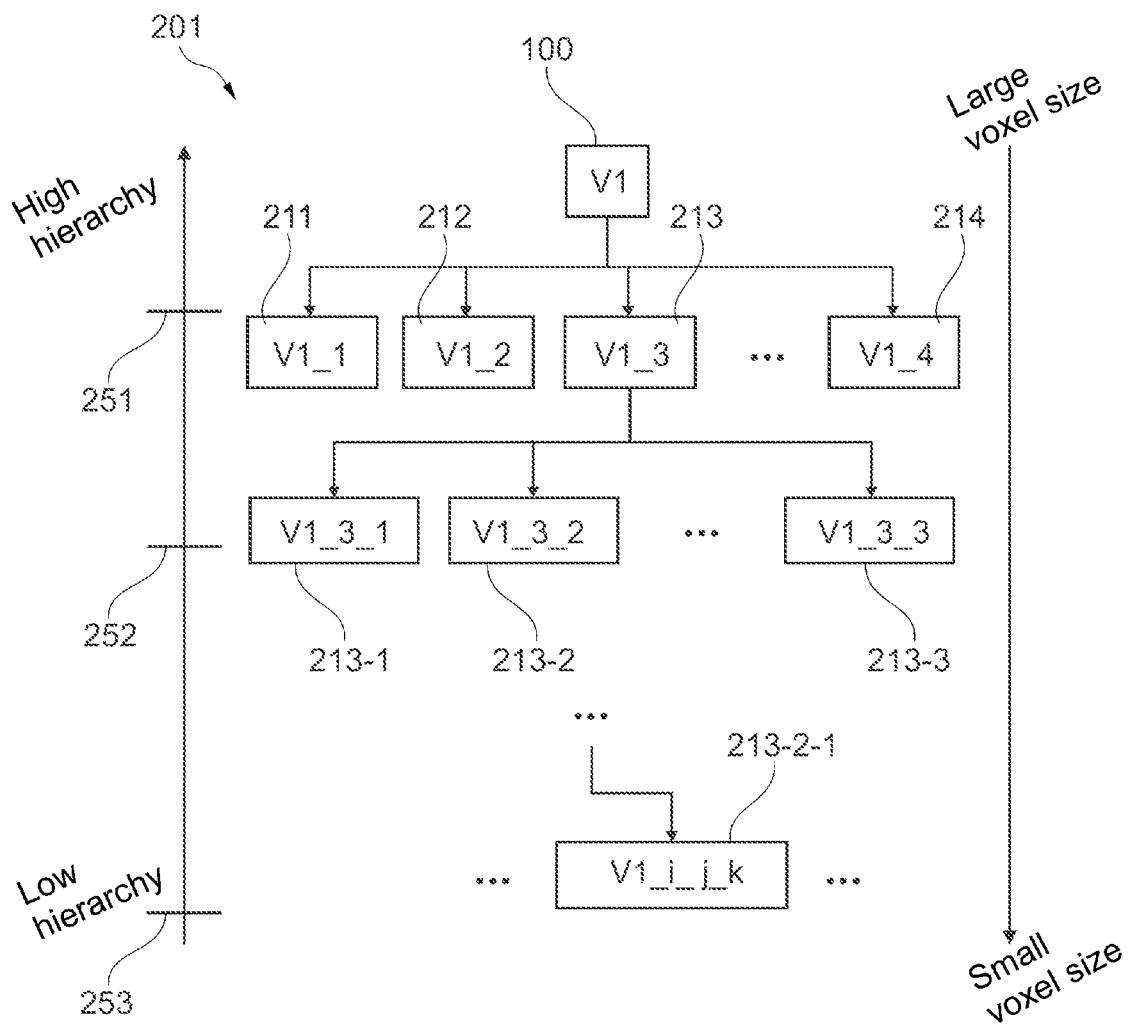
FIG. 5 schematically illustrates various hierarchical levels of the hierarchical bricking in accordance with various examples.

FIG. 5 illustrates aspects in association with the nested, hierarchical structure of the bricking 201. FIG. 5 illustrates the tree structure of the bricking 201. FIG. 5 shows how the bricks, proceeding from the upper hierarchical level 251 toward the lower hierarchical levels 252, 253, are derived from one another or defined as partial volumes in order to define the hierarchy. For example, FIG. 5 illustrates that the bricks 213-1-214-3 are derived in each case from the brick 213, i.e. include different partial volumes of the volume of the brick 213. This corresponds—formulated in a generally applicable way—to a nesting of the bricks of different hierarchical levels.

Such techniques are based on the insight that a complete 3-D image data set 100 having a number of ABC voxels 290 (cf. FIG. 3) typically does not fit into the memory of a processor in association with the processing (cf. FIG. 1). The same applies to large-area 2-D image data sets. On the other hand, defects are included only in a small partial region of the image field or image volume, for example as far as a few NMP voxels, with N, M, P in each case being approximately 30 or less. Examining properties of these defects typically involves only the corresponding fraction of image elements of the entire image data set. Such a small fraction can readily be held in the main memory. For example, the bricks can include parts of the entire depicted region of the image data set. For example, the bricks can be stored together with their position in the entire depicted volume. The bricks can be stored such that the voxels included in the bricks can be processed individually.

In some examples, it may be worthwhile for neighboring bricks to have a specific overlap region (such an overlap region is not shown in the examples in FIGS. 3-5). Some algorithms that can be used in association with the processing can operate particularly accurately as a result of the overlap. One example would be a smoothing algorithm.

A practical example in association with the application of the hierarchical bricking is given below. This example concerns the recognition of a defect in a transistor gate as semiconductor component. If the gate has a structure size that fits into a brick having NMP voxels on a corresponding hierarchical level, all bricks of the corresponding hierarchical level can be processed individually in association with the recognition of a transistor gate. For example, firstly a check could be made to ascertain whether a specific brick of the corresponding hierarchical level depicts a transistor gate. If this is applicable, a check can then be made to ascertain whether or not a defect is present. In such a process, the individual bricks can be processed sequentially or in parallel. The parallelization can be implemented particularly efficiently on a GPU, for example. Without suitable bricking of the imaging volume, with limited computational resources it may even become impossible to recognize the defects.

Applying the bricking to the image data set can be done with no loss of information. For example, the voxel size of the voxels 290 in bricks 213-2-1 on the bottommost hierarchical level 253 (cf. FIG. 5) could be equal to the native voxel size of the 3-D image data set. In order that the context of structures that are depicted by an individual brick is not lost, the hierarchical approach in accordance with FIG. 5 can be used (i.e. a nesting of the bricks of the various hierarchical levels in one another). Without the hierarchical approach, it would not be possible for example to establish whether a line structure depicted by a brick on the bottommost hierarchical level is part of a logic semiconductor component or part of a memory component. With the hierarchical approach, however, it is possible to retrace a relationship between structures in bricks on different hierarchical levels.

In order to enable a particularly good correspondence between the partial regions of the measurement volume that are depicted by the bricks of a respective hierarchical level and physically-technically relevant information in association with structures, in general it may be possible for the image element size of the bricks on the hierarchical levels to be determined in accordance with or on the basis of the structure sizes of the semiconductor components. The hierarchical levels themselves, i.e. e.g. the number of hierarchical levels, can also be determined in accordance with the structure sizes of the semiconductor components. It would also be conceivable for the brick sizes to be determined in accordance with the structure sizes of the semiconductor components.

For example, it would be possible for the user to specify a sample type to be examined of the depicted sample including the semiconductor components, via an HMI. However, the sample type could also be determined on the basis of object recognition, for instance in a 2-D overview image. The sample type could also be determined by a work sequence or context. Depending on the sample type, it is then possible to define what semiconductor component types are present in the respective sample type. The various semiconductor component types can in turn be linked with typical structure sizes in the database. The hierarchical levels and the associated image element sizes can then be determined on the basis of these structure sizes stored in the database.

Alternatively or additionally, it would also be possible to determine the number of image elements of the bricks on the hierarchical levels on the basis of the structure sizes of the semiconductor components, i.e. e.g. the number of pixels or voxels per brick. This means, in other words, that a size of the bricks can be determined on the basis of the structure sizes of the semiconductor components, e.g. on the basis of an exterior dimensioning and/or a distance between semiconductor components of the same type. Such information can also be stored in the database, in each case in a manner assigned to a corresponding sample type. It is then possible for the corresponding imaging device 91 to be controlled in a suitable manner, for instance in block 1001 (cf. FIG. 2).

The following TAB. 2 contains an exemplary implementation of such a database that makes it possible to determine the image element size and/or the number of image elements of the bricks on the plurality of hierarchical levels and/or of the hierarchical levels themselves. It would be possible, for example, then to look up the structure sizes of the semiconductor components in such a database and then to determine the voxel size accordingly. For example, it would be conceivable for such a database to indicate in each case what semiconductor component types should be expected on a specific hierarchical level. Then the respective structure size of these semiconductor component types can be identified and a suitable configuration of the parameters mentioned above can be effected.

TABLE 2

Example of a database which relates sample types to properties of the hierarchical bricking, and available label classes of the various structures. The database could be implemented as a graph, for example, in order to describe the relationship/context between the various hierarchical levels. The database thus includes a priori information about the relationship of semiconductor components across the various hierarchical levels.

| Sample type | Number of hierarchical levels | Description of the hierarchical levels and respective voxel size |
|---|---|---|
| 2-Deck VNAND memory chip | 4 | Hierarchical level 1: image element size 0.1-0.2 μm. Represents a single deck, that is to say has for example an extent that covers the depth direction of the deck.<br>Hierarchical level 2: image element size 50 nm. Represents a plurality of trenches in the deck. That is to say that a voxel or pixel resolves a single trench in the transverse direction, but a plurality of trenches are represented. Channels are situated between the trenches.<br>Hierarchical level 3: image element size 10 nm. Represents individual memory cells, each including e.g. a plurality of channels.<br>Hierarchical level 4: image element size 2 nm. Represents individual channels of a cell. |
| 2-D CPU Chip | 5 | Hierarchical level 1: Overview image of a wafer, e.g. 300 mm wafer.<br>Hierarchical level 2: image element size 0.5 mm. The bricks represent the individual cutting edges for dies on the wafer.<br>Hierarchical level 3: image element size 10 μm. The bricks represent the individual dies and lithography markers.<br>Hierarchical level 4: image element size 100 nm. The bricks represent individual functional regions, such as, for example, memory units, CPU, input/output, etc.<br>Hierarchical level 5: image element size 10 nm. The bricks represent individual transistors, for example finFets.<br>Hierarchical level 6: image element size 2 nm. The bricks represent units of individual transistors, that is to say e.g. source terminal, gate terminal and drain terminal. |

TABLE 2-continued

Example of a database which relates sample types to properties of the hierarchical bricking, and available label classes of the various structures. The database could be implemented as a graph, for example, in order to describe the relationship/context between the various hierarchical levels. The database thus includes a priori information about the relationship of semiconductor components across the various hierarchical levels.

Figure 13:
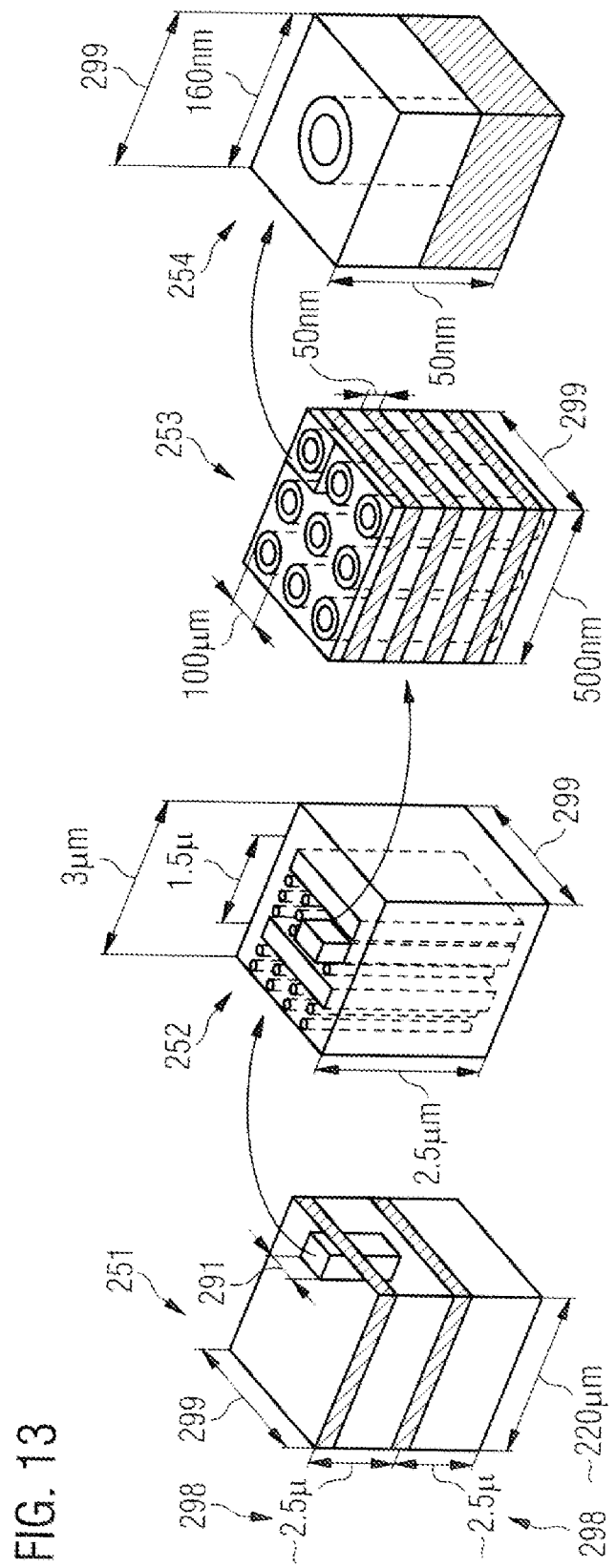
FIG. 13 schematically illustrates various hierarchical levels of semiconductor components and correlating hierarchical levels of the hierarchical bricking in accordance with various examples.
Figure 14:
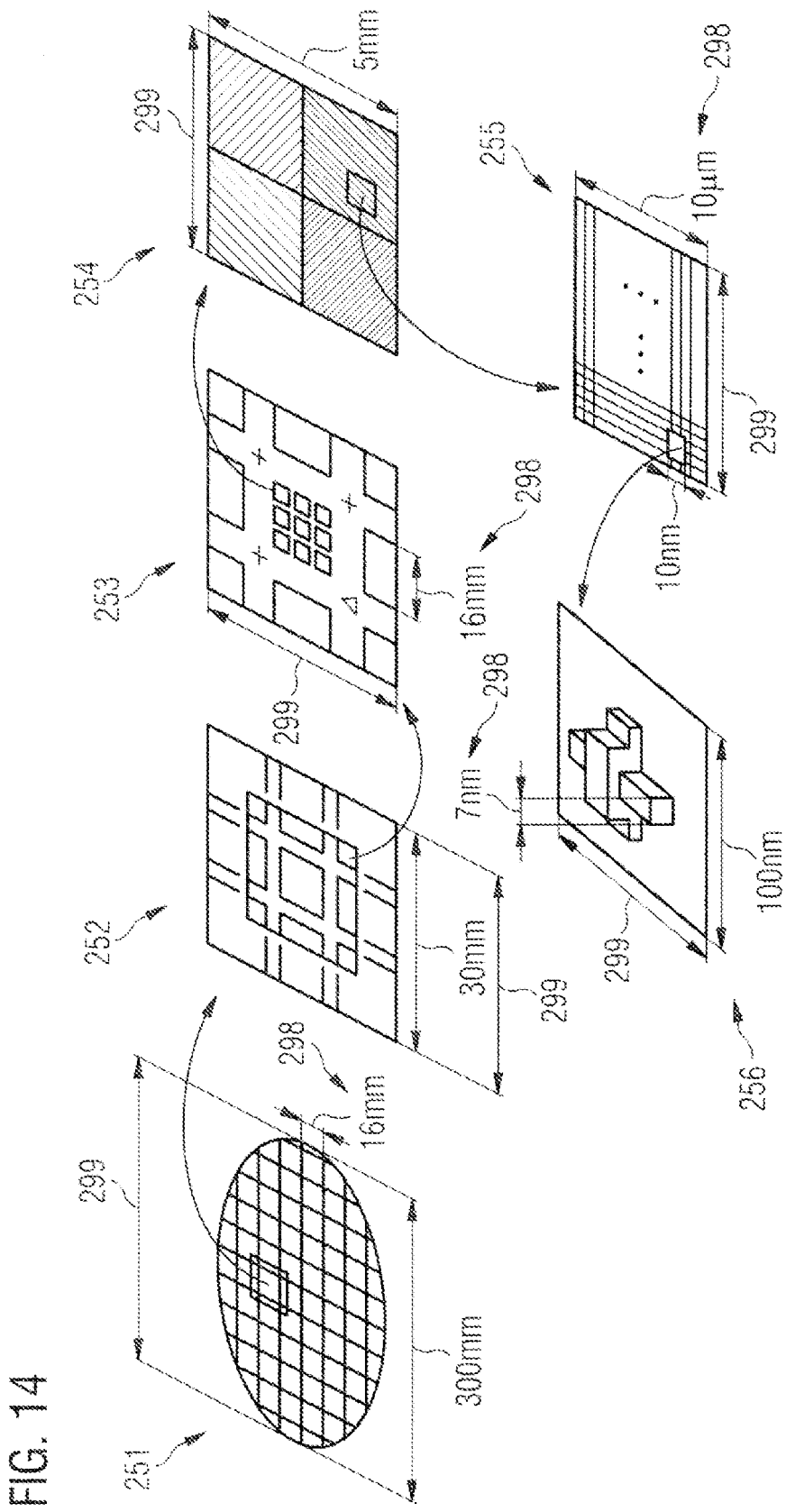
FIG. 14 schematically illustrates various hierarchical levels of semiconductor components and correlating hierarchical levels of the hierarchical bricking in accordance with various examples.

The example of the sample type "2-deck VNAND memory chip" is illustrated in association with FIG. 13, wherein the hierarchical levels 1-4 from TAB. 2 are designated there by the reference signs 251-254. The example of the sample type "2-D CPU chip" is illustrated in FIG. 14, wherein the hierarchical levels 1-6 from TAB. 2 are designated there by 251-256. FIG. 13 and FIG. 14 also illustrate typical structure sizes 298 of the semiconductor components. The edge length 299 of the bricks is also illustrated in FIG. 13 and FIG. 14. The edge length 299 of the bricks is also determined on the basis of the structure size 298 of the various semiconductor components: the edge length 299 is typically chosen such that a semiconductor component and the surroundings thereof are completely depicted in a brick, that is to say that e.g. an inter-semiconductor component spacing can be used to determine the edge length 299. All such information can be loaded from a corresponding database, for instance.

By way of example, in FIG. 13, in association with the hierarchical level 251, there are two so-called decks separated by a "bit line" layer. The hierarchical level 252 shows two trenches from an array of many trenches that is arranged in one of the decks. By way of example, a typical distance between the trenches is in the region of 1.5 μm, and so the edge length 299 of the bricks can be dimensioned accordingly in order to display two or more trenches per brick. In this way, it is possible to acquire a structure context when displaying a brick. On the other hand, the voxel size can be dimensioned accordingly so that individual trenches are resolved (the diameter of the trenches is typically of the order of magnitude of 0.1 to 0.2 μm). In general, therefore, the image element size of the bricks of a hierarchical level can be gauged from the structure size of individual semiconductor components, while the brick size of the bricks of the hierarchical level can be gauged from the distance between the individual semiconductor components and/or from an exterior dimensioning of the semiconductor components.

This can also applied to the bricks on the hierarchical level 253. The latter shows holes between the trenches that have a diameter of approximately 0.1 μm and a spacing of approximately 0.15-0.2 μm. The bricks on the hierarchical level 253 thus have an edge length 299 such that a few of the holes—3×3 holes in the example shown—can be represented. The voxel size is dimensioned with 20 nm, for example, such that some voxels are obtained per hole.

A single hole can then be represented with high resolution on the hierarchical level 254.

Corresponding considerations can also be applied to a 2-D bricking, as illustrated in FIG. 14. In this figure, a wafer with all the dies is represented in the hierarchical level 251, a single die including so-called "die rails" is depicted on the hierarchical level 252, a plurality of chips within individual "die rail" markings are depicted on the hierarchical level 253, the hierarchical level 254 then shows the individual logic assemblies (e.g. memory, CPU, etc.) of a chip, the hierarchical level 255 shows the environment of transistors of the logic assemblies, and, finally, the hierarchical level 256 shows individual transistors, such that the terminals ("gate", "source", "drain") are resolved.

Referring once again to FIG. 5: The hierarchical bricking is explained on the basis of the following example. For example, a hierarchical bricking 201 having three hierarchical levels 251-253 could be present. A specific brick 213-2-1 on the bottommost hierarchical level 253 identifies a hole structure. The brick 213-2 on the middle hierarchical level 252 (which includes the specific brick 213-2-1 on the bottommost hierarchical level 253 with the hole structure) in turn identifies a transistor cell. The brick 213 on the topmost hierarchical level 251 (which includes the bricks 213-2, 213-2-1 on the middle and lower hierarchical levels 252, 253 with transistor cell and hole structure) identifies a specific logic group of semiconductor components or overviews of the semiconductor components. In this case, the example describes a logic line proceeding from a small voxel size (for detailed information concerning structures having small structure sizes) toward a larger voxel size (for context information concerning structures having large structure sizes). It is also possible to track a logic line proceeding from large voxel sizes toward smaller voxel sizes: for example, firstly logic assemblies could be identified in the depiction volume in a brick 213 of the topmost hierarchical level 213; on the next lower hierarchical level 252, so-called vias (as conductive connections between different semiconductor layers that are oriented perpendicular to semiconductor layers) could then be identified in a brick 213-2 derived from the brick 213; finally, on the next lower hierarchical level 253, the interconnects of the vias could be checked with regard to defects or their overlap with metal layers in a further derived brick 213-2-1.

The bricking 201 in accordance with FIG. 5 is one example. Modifications and variants of the bricking 201 in accordance with FIG. 5 are conceivable in the various examples described herein.

For example, it would be possible for the voxel size to scale for bricks from one hierarchical level to the next hierarchical level in accordance with various factors. That is to say that the voxel size can scale nonlinearly between bricks on different hierarchical levels. This may be advantageous, for example, if firstly large structures (for example logic assemblies or memory chips) are intended to be depicted, namely in bricks on an upper hierarchical level; and then only two further hierarchical levels are involved for individual transistor rows and memory rows and geometric basic forms such as line or hole). In such a case, the voxel size scales from the first hierarchical level to the second hierarchical level to a particularly large degree, for example by a factor of one hundred; while between the second hierarchical level and the third hierarchical level the voxel size scales only moderately, for example by a factor of two. This makes it possible to adapt the actual voxel size in the bricks of different hierarchical levels depending on structure sizes of structures. The same can correspondingly also be implemented for pixel sizes in the case of 2-D image data sets.

It is also possible to use different edge lengths for the bricks on different hierarchical levels. That means that the edge length of bricks on different hierarchical levels scales differently for different edges. As a result, structures having aspect ratios not equal to 1 can be depicted particularly well.

The techniques described herein in association with the hierarchical bricking 201 are also based on the insight that different semiconductor components at low resolution/very high sampling often have the same geometric structures, that is to say, for instance, geometric basic forms such as e.g. lines, holes or points. Geometric basic forms here thus denote e.g. the elementary building blocks from which semiconductor components are constructed—these typically come from so-called "design rules" stipulating what forms can be printed by a lithography machine. A wide variety of semiconductor components, such as, for example, transistors, capacitors, vias, gates, etc., are thus typically composed of a relatively limited, common form variety of geometric basic forms. The geometric basic forms can thus form functional groups (i.e. groups composed of geometric basic forms) such as the semiconductor components. These small structures are produced with particularly high accuracy. Defects occur rarely if the production process is well defined. This can be exploited to reduce the size of the stored data. For example, bricks on a lower hierarchical level which depict identical structures could be discarded in part. It is generally possible for at least some bricks on a hierarchical level to be discarded depending on redundancies in the depicted structures. This can also be referred to as a dictionary approach: in this regard, it would be possible that for each structure only a representative data set in the form of a corresponding brick is stored and redundant bricks are discarded. It is then optionally possible to store metadata in association with the discarded bricks, that is to say for example the number and/or position and/or orientation etc. of the corresponding structures in the discarded bricks.

As a practical example: an image volume of the 3-D image data set includes 10 000 holes. A single hole can be depicted for example by a brick of a lower hierarchical level having NMP voxels of appropriate voxel size. The entire image volume includes ABC voxels. It may then be possible, instead of storing and processing the entire image volume having ABC voxels, to store only the partial volume having NMP voxels, for example together with metadata indicating the positions of the 10 000 holes in the image volume, for example in a 3-D coordinate system that correlates with the bricking, for instance. This not only drastically reduces the desired memory properties and the processing complexity, but also makes it possible to find structures a second time particularly efficiently, to evaluate local correlations between the same structures and structures of different types, etc.

In this case—for example depending on the field of application—it is possible to use a comparatively sensitive or robust definition for redundancies. That is to say that it is possible to use different definitions for similarity of structures (which can result in bricks being discarded). For example, in this way structures that deviate too greatly from a class representative can be retained by maintaining the corresponding brick in the stored data set. Defects and anomalies can be found well in this way.

Various techniques in association with applying a hierarchical bricking 201 to an image data set 100 have been described above. The hierarchical bricking 201 enables a particularly efficient processing of the image data set pretreated in this way: Referring once again to FIG. 2: after applying the bricking to the image data set 100, processing of the image data set is carried out in block 1004, using the hierarchical bricking.

This processing can be carried out multihierarchically: that is to say that the processing can be carried out using the hierarchical bricking 201.

In general, in the various examples described herein, it is possible to apply various techniques in association with the processing of the image data set in block 1004. For example, depending on the field of application of the techniques described herein—i.e. for example depending on the information content of the image data set—there may be a specific preference in association with processing techniques. Exemplary techniques in association with the processing of the image data set are described in FIG. 6.

Figure 6:
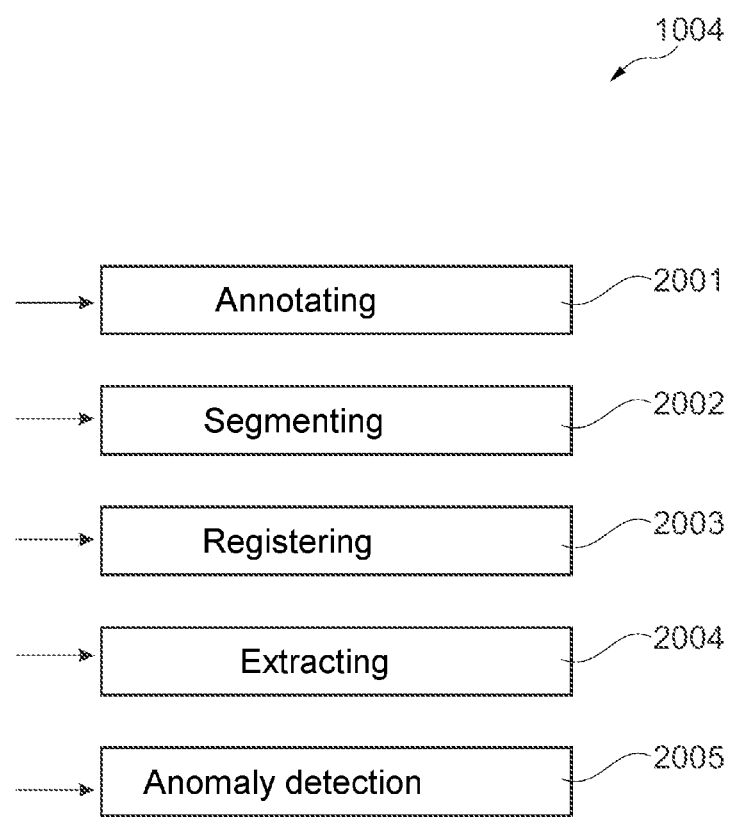
FIG. 6 schematically illustrates various aspects for data processing in accordance with various examples.

FIG. 6 illustrates aspects in association with the processing of an image data set to which a hierarchical bricking has been applied. This means that the various blocks from FIG. 6 could be implemented for example in association with block 1004 from FIG. 2.

In this case, it is not necessary to apply all the variants described in FIG. 6 for the processing of the 3-D image data set with hierarchical bricking. Just individual variants from among those represented in FIG. 6 could be used. If use is made of a plurality of variants for the processing of the 3-D image data set with hierarchical bricking, then the order can deviate from the order represented in FIG. 6.

Block 2001 involves carrying out an annotation. In the context of the annotation, labels are allocated to structures.

The labels can classify the structures in one or more classes of a multiplicity of predefined classes. The labels can thus be associated with different structure classes. This means that a logical description of structures can be performed via the labels. It is not absolutely necessary also to provide information about the position and/or orientation of corresponding structures in the bricks in association with the labels. This is optional. For example, it would be possible for the labels to segment the structures in the image space or to provide them with a bounding box.

In general, allocating the labels to the structures can be carried out automatically, partly automatically or manually in block 2001. By way of example, a classification algorithm could be used for a (partly) automatic implementation. For example, an object recognition algorithm could be used. This algorithm can optionally enable a segmentation of the recognized structures. While an object recognition algorithm without segmentation can place a so-called bounding box around the structures, for example, an object recognition algorithm with segmentation can effect a particularly fine delimitation of the corresponding structure vis-à-vis the background at a voxel level. An object recognition algorithm with segmentation therefore makes it possible to extract specific structures particularly accurately.

In this case, generally the labels are allocated to the structures in the bricks on the plurality of hierarchical levels. Since the bricks on the different hierarchical levels generally have different sizes and also different voxel sizes, the depicted structures are also different from hierarchical level to hierarchical level. By way of example, particularly small structures such as trenches or holes or other geometric basic forms could be depicted in the bricks on the bottommost hierarchical level; while particularly extensive or large structures, for instance entire semiconductor components or even logic groups including a plurality of semiconductor components, are depicted in the bricks on the topmost hierarchical level. Accordingly, the labels can also vary from hierarchical level to hierarchical level. For example, it would be possible for the labels of the structures in bricks on a lower hierarchical level to be selected from a first candidate set including geometric basic forms (for example holes, lines or points). By contrast, the labels of the structures in bricks on an upper hierarchical level can be selected from a second candidate set including the semiconductor components, a logic group having a plurality of semiconductor components, interconnects and/or lithography markers. This means that the available labels can be adapted depending on the hierarchical level. This can once again be done on the basis of a database describing the sample type, cf. TAB. 2.

The labels can be used for example for navigating through the image data set. That means that an HMI can be correspondingly controlled for navigating taking into account the labels. For example, the user could specify that a specific semiconductor component (that is to say with a specific label) is intended to be displayed. The corresponding brick including the semiconductor component with the corresponding label can then be represented to the user via the HMI. It would also be possible for the labels of the structures respectively situated in the represented region to be in each case identified during the manual navigation through the image data set in order to be able to provide the user with context information in this way.

Block 2002 describes the carrying out of a segmentation. As already mentioned above, the segmentation can also be carried out in association with allocating labels.

By way of example, simple, exemplary segmentation could perform an association of voxels in accordance with the labels "foreground" and "background". However, it is not necessary in all examples for the segmented structures also to be classified in association with the segmentation. For example, only regions having one and the same contrast could be determined in the context of the segmentation in block 2002, but without performing a classification. It may be helpful in such an example as well if the segmentation operates on the basis of the hierarchical bricking 201, i.e. for example a segmentation is carried out in parallel in bricks of different hierarchical levels 251-253. This is because it is thereby possible to prevent the segmentation from being influenced by an excessively high degree of detail of structures on the different hierarchical levels. The segmentation can be carried out particularly rapidly.

Segmented structures can be used in association with metrology, for example. For example, geometric parameters can be determined and checked. In this context, the segmentation can enable for example an edge extraction along semiconductor layers or a surface extraction from semiconductor layers. As a result, a particularly high resolution, even higher than the native resolution of the 3-D image data set, can be used in association with metrology. A CAD model could also be extracted.

Block 2003 describes the carrying out of a registration. The registration can be effected in relation to a reference data set or other geometric reference data. For example, the registration can make it possible to determine the arrangement of the semiconductor structure in the image data set in relation to a CAD mask file.

In association with the registration, typically two depicted volumes are registered to one another by these volumes being compared with one another. In principle, the highest possible resolution should be used in association with depicting the volumes in order to enable an accurate registration. For 3-D image data sets 100 that depict semiconductor components, this is not always possible in accordance with a reference implementation because the amount of data is particularly large. Cutting out partial volumes from the entire image volume is often not possible, however, on account of the repetitive character of semiconductor structures on wafers. For example, a wafer can often include a repetitive arrangement of identical structures that later form different chips. Therefore, the registration in block 2003, as described in detail below, can take account of the bricking 201.

For example, the registration of structures in the bricks on the plurality of hierarchical levels 251-253 could be effected. This means that the registration can be carried out in each case for each of the different hierarchical levels 251-253.

For example, the accuracy of the registration could be iteratively refined in such an approach. The registration could be carried out for example iteratively proceeding from bricks on a higher hierarchical level 251 toward bricks on a lower hierarchical level 252, 253. This can mean that firstly a coarse registration with the comparatively large voxels of the bricks on the topmost hierarchical level is carried out; and then the coarse registration is gradually refined by using the increasingly smaller voxels of the bricks on lower hierarchical levels. This can enable a particularly efficient and rapid registration.

In block 2004, the extraction of structures is carried out. For example, anomalies of structures which do not correspond to predefined reference structures can be recognized. It would then be possible for the corresponding bricks which depict such anomalies to be extracted and represented to the user via a user interface. The user can then decide whether a new class is defined or whether a defect is present.

In the context of block 2004, a region of interest could also be defined, for example. For example, a user could stipulate that the intention is to examine such regions of the image volume in which tightly packed lines within memory components are considered. Through the use of the multihierarchical bricking 201, context information about the relationship between lines depicted as structures in bricks of a low hierarchical level and memory components depicted as structures in bricks of an upper hierarchical level can be used for identifying the region of interest.

In association with block 2004, for example, a CAD model of the semiconductor components could also be created, i.e. a simplified geometric representation of extracted structures can be positioned at the respective associated position. For example, a line placeholder could be used. For example, a spline line could be used to represent the edge of a segmented structure. If semiconductor components having a plurality of layer planes are present, a 2-D segmentation of each individual layer can be effected. A plurality of planes can then be generated in a CAD model file.

In block 2005, an anomaly detection can be carried out. Deviations of the depicted structures from predefined references can be recognized here. By way of example, segmented structures can be used for this purpose (cf. blocks 2001 and 2002). For example, a comparison between the extracted structures vis-à-vis references can be effected in order to detect anomalies. For example, difference formation can be effected, and regions with a large difference can be identified as a potential defect.

An explanation is given below of further details in association with the various possible processing steps in accordance with FIG. 6. Firstly, reference is made to techniques in association with the allocation of labels to the structures, i.e. details concerning block 2001 are described. A corresponding example is illustrated in FIG. 7.

Figure 7:
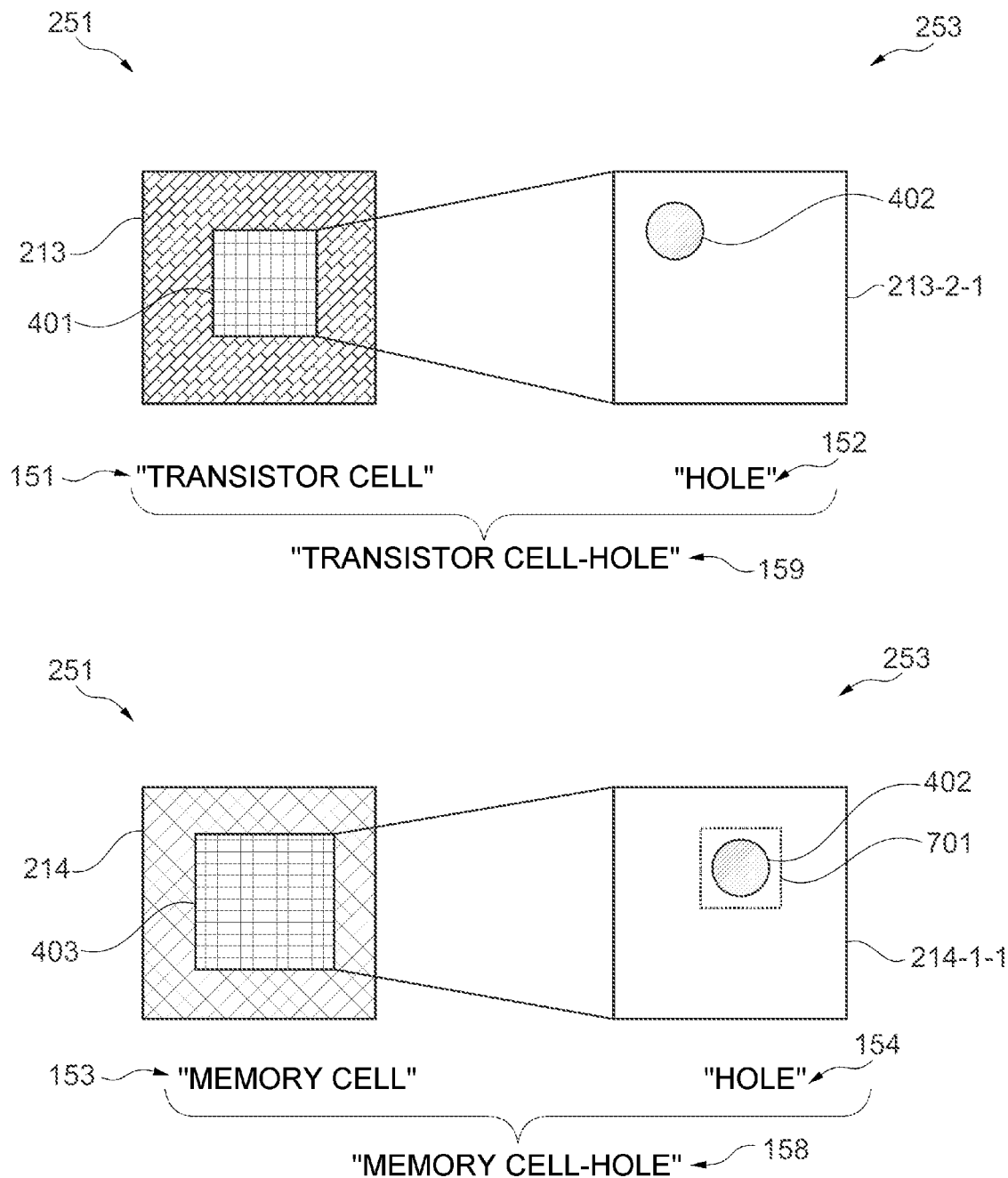
FIG. 7 schematically illustrates structures in bricks on different hierarchical levels and also multihierarchical labels for the structures in accordance with various examples.

FIG. 7 illustrates aspects in association with the allocation of labels to structures 401-403. For example, FIG. 7 illustrates aspects in association with the allocation of multihierarchical labels. The example in FIG. 7 illustrates the allocation of multihierarchical labels in association with a 3-D image data set; corresponding techniques can analogously also be applied to a 2-D image data set.

FIG. 7, at the top, illustrates a 2-D section through the brick 213. The brick 213 depicts a structure 401. The label 151 is allocated to the structure 401. This label describes "TRANSISTOR CELL".

The brick 213 is on the hierarchical level 251 and also includes the brick 213-2-1 on the hierarchical level 253 (cf. FIG. 5). The brick 213-2-1 depicts a structure 402. The label 152 is allocated to a structure 402. This label 152 describes "HOLE".

It is possible to derive therefrom a multihierarchical label 159 describing: "TRANSISTOR CELL-HOLE".

FIG. 7, at the bottom, illustrates a 2-D section through the brick 214. The brick 214 depicts a structure 403. The label 153 of this structure 403 describes "MEMORY CELL".

The brick 214 is on the hierarchical level 251 and also includes the brick 214-1-1 on the hierarchical level 253. The brick 214-1-1 depicts the structure 402 having the label 154 "HOLE". In the example in FIG. 7, the label 154 also includes a bounding box 701. A multihierarchical label 158 "MEMORY CELL-HOLE" can be derived from the label 153 and the label 154.

This means that for structures 402 in a brick 213-2-1, 214-1-1 of a lower hierarchical level 253 labels 151, 153 from structures 401, 403 in a corresponding brick 213, 214 on an upper hierarchical level 251 can be inherited. The multihierarchical, combined label 158, 159 is obtained in this way.

By way of example, in this context, it would be conceivable that for the example in FIG. 13 a multihierarchical label is allocated which has the form: "DECK[1]; TRENCH[2-3]; CHANNEL[27-48]; INSULATION".

By way of example, in this context, it would be conceivable that for the example in FIG. 14 a multihierarchical label is allocated which has the form: "DIE[10]; CHIP[5]; TRANSISTOR[18]; GATE".

The indication of structures of identical type on a hierarchical level is also included in these examples.

In general terms, it may be possible to indicate semiconductor components of identical type (i.e. semiconductor components of the same hierarchical level and of the same type) via the labels.

Such techniques are based on the insight that the information of different hierarchical levels can be combined efficiently via the bricking in order to derive additional information in this way. While in the example in FIG. 7 differences between the structures 401, 403 are clearly recognizable on the high resolution in the bricks 213, 214 on the hierarchical level 251, the hole structures 402 on the hierarchical level 253 in the bricks 213-2-1, 214-1-1 are not distinguishable without context information. This is owing to the fact that both the transistor cell and the memory cell include a hole that becomes visible only in the finer resolution in the bricks 213-2-1 and 214-1-1 on the hierarchical level 253. The holes 402 are not visible in the coarse resolution of the bricks 213, 214 of the hierarchical level 251. By combining this information of the labels 151, 153 in the bricks 213, 214 with the labels 152, 154 in the bricks 213-2-1 and 214-1-1, it is possible to determine the multihierarchical label 158 and 159, respectively. A differentiation can then be performed during the analysis. This may be worthwhile because—despite the identical appearance of the holes 402 in the bricks 213-2-1 and 214-1-1—these holes 402 may have different modes of functioning in association with the transistor cell and the memory cell, respectively. This means that, for example, the tolerance vis-à-vis defects or impurities may be completely different.

The multihierarchical labels 158-159 can also improve the processing capabilities. For example, filter requests can be made in a targeted manner. By way of example, in the entire measurement volume ABC it may be possible to localize the structure "MEMORY CELLS-HOLE" with an accuracy of the smallest voxel size. For example, after extracting the positions of all "MEMORY CELLS-HOLES", correlations between the positions could be examined without being accompanied in the process by the "TRANSISTOR CELLS-HOLES" having an identical appearance (on a very small brick hierarchy).

Figure 8:
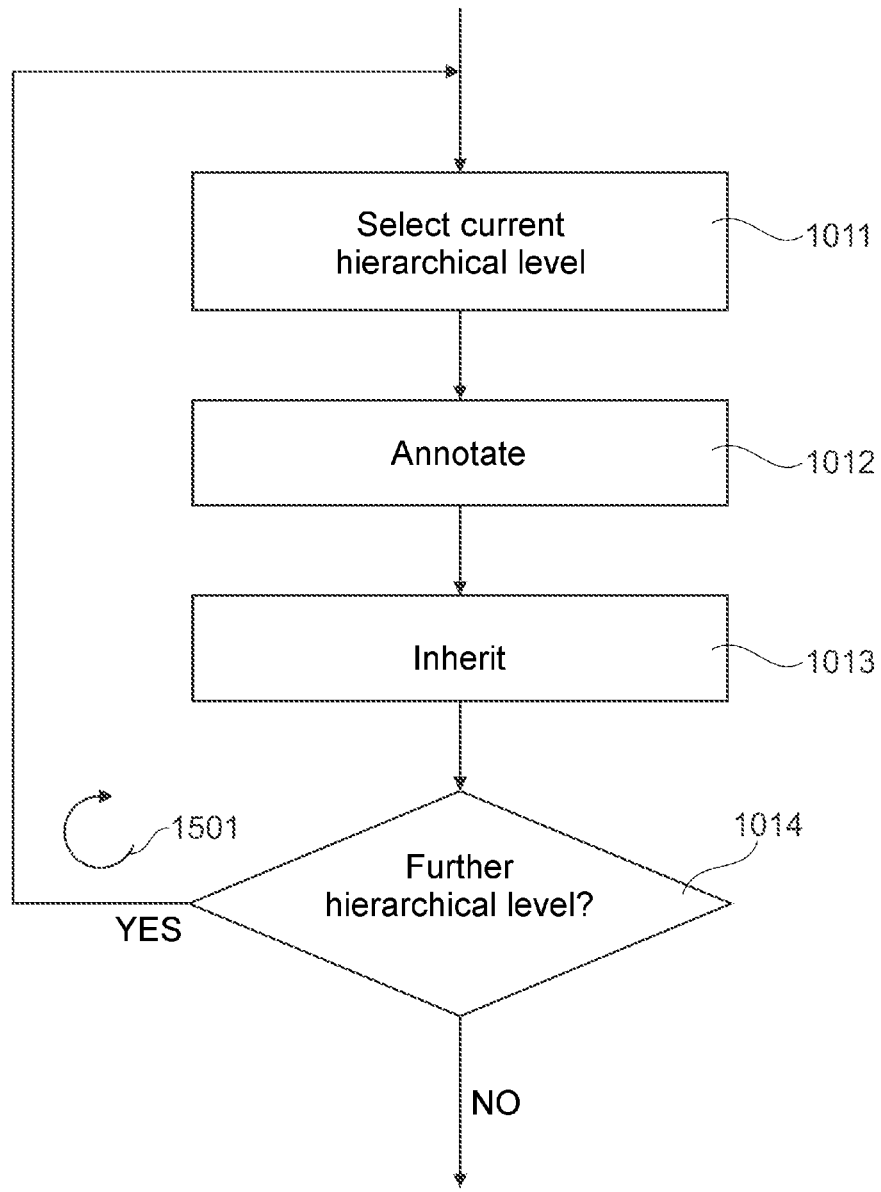
FIG. 8 is a flowchart of an exemplary method.

An exemplary procedure for allocating the labels, and for example the multihierarchical labels, is described in association with FIG. 8.

FIG. 8 is an exemplary flowchart. For example, the method in accordance with FIG. 8 could be carried out in association with block 2001 from FIG. 6.

In block 1011, firstly a current hierarchical level 251-253 is selected. For example, the topmost hierarchical level 251-253 not yet processed could be selected (i.e. in the first iteration 1501 the topmost hierarchical level of the bricking 201).

In block 1012, labels are then allocated to the structures visible in the different bricks on the current hierarchical level. For example, the different bricks could be processed sequentially or in parallel. Allocating the labels can be effected manually. A (partly) automatic allocation of labels is also conceivable, e.g. using an object recognition algorithm.

In general, it would be possible to take account of context information when allocating labels in the current hierarchical level 251-253. The context information can be determined on the basis of already annotated structures in higher hierarchical levels 251-253. The context information can thus take into account e.g. the relationship between the semiconductor components of different levels. If, e.g. in the example in FIG. 13, a structure "TRENCH" is recognized for the hierarchical level 252, then this can be effected taking account of the context information that the corresponding brick(s) of the hierarchical level 252 which include the structure "TRENCH" are part of a higher-hierarchical brick of the hierarchical level 251 which include the structure "DECK". The context information can indicate (as a priori knowledge) that the structure "DECK" includes a plurality of structures "TRENCH". The context information can be derived from a database, cf. TAB. 2. As a result, the annotation can be effected particularly reliably and take account of a semantic context (which is made possible by the hierarchical bricking).

As an optional extension, in association with the context information, geometric reference data could also be taken into account. That means that for example for a structure on a higher hierarchical level a corresponding reference for the geometry can be available and the fact of which structures should be present in the brick on the lower hierarchical level (optionally also the corresponding position) can then be derived from the reference.

In block 1013, the structures annotated in the current hierarchical level then inherit the labels from the upper hierarchical levels in order to generate the multihierarchical labels.

Finally, block 1014 involves checking whether there is still a further hierarchical level to be processed—if appropriate, blocks 1011-1013 are then carried out again in a further iteration 1501.

The procedure in accordance with the method from FIG. 8 will be described briefly below in an example: in a first iteration 1501, a specific region of the image volume in one or more bricks of the topmost hierarchical level is annotated as "LOGIC UNIT" (block 1012); in a second iteration 1501, a portion of these structures annotated as "LOGIC UNIT", in one or more bricks of the next lower hierarchical level, is annotated as "TRANSISTOR CELL" (block 1012); in the third iteration 1501, within the structures annotated as "TRANSISTOR CELL", a structure is then annotated as "HOLE" (block 1012). This hole structure then obtains the multihierarchical label "HOLE-TRANSISTOR CELL-LOGIC UNIT", by inheritance (block 1013).

Various techniques are based on the insight that annotating all the structures manually may sometimes be laborious. Therefore, in association with FIG. 9, examples are described which make it possible to carry out the annotation partly or fully automatically.

Figure 9:
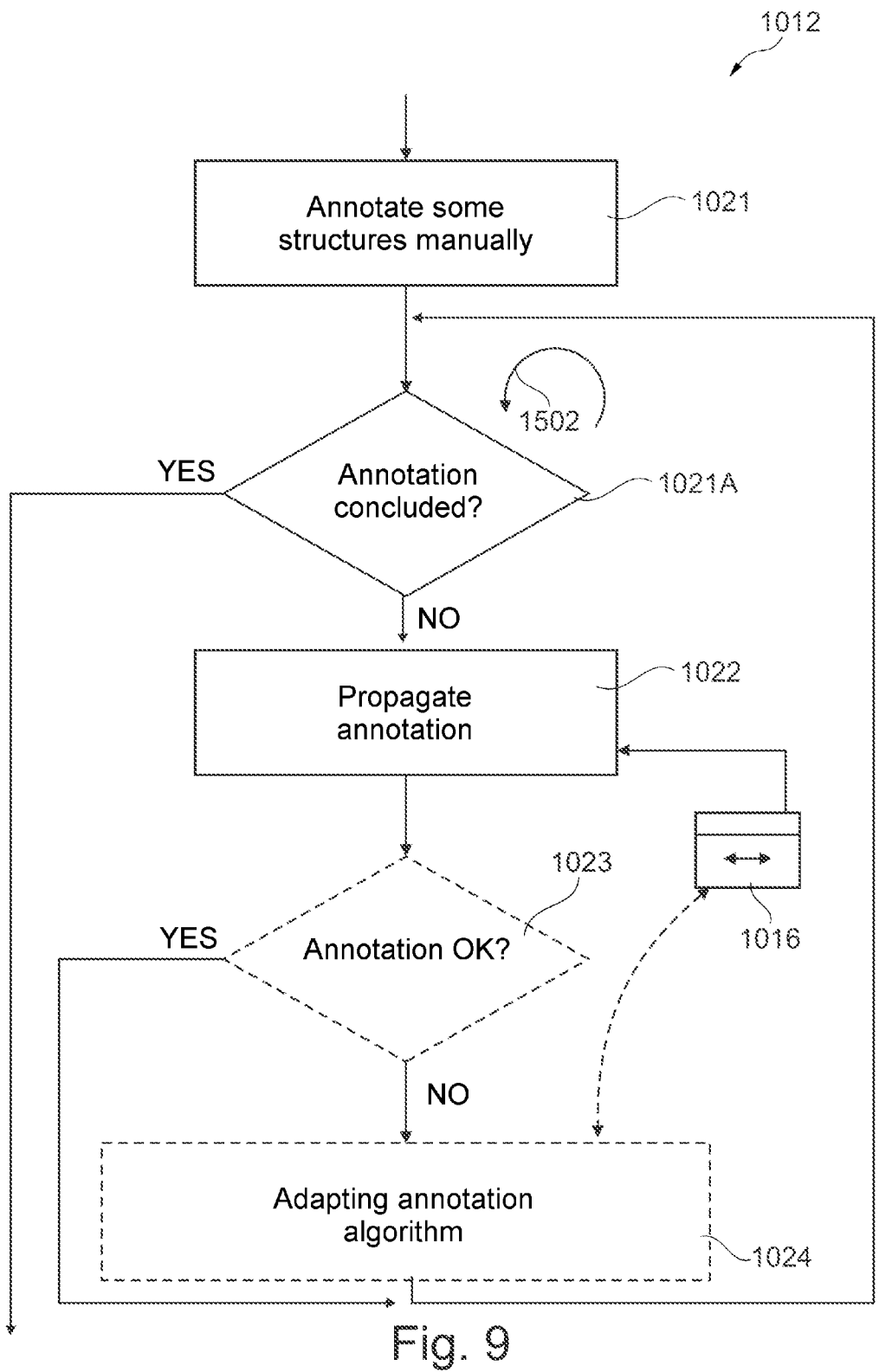
FIG. 9 is a flowchart of an exemplary method.

FIG. 9 is an exemplary flowchart. For example, the method in accordance with FIG. 9 could be carried out as part of block 1012 from FIG. 8. FIG. 9 illustrates aspects in association with propagating labels between structures, i.e. the automatic allocation of labels to structures not previously provided with labels.

Manually annotating all structures within an image volume may be laborious. A propagation of labels between structures can be effected using image processing techniques, for example cross-correlation, or machine learning. This means that it is sufficient, for example, if only some structures are provided with a label manually; a corresponding propagation algorithm can then find all structures of identical type and automatically provide them with corresponding labels. Such a method can also be applied in association with a multihierarchical bricking: here the labels from one brick or some bricks can be propagated to all other bricks of the same hierarchical level.

When propagating labels between bricks of the same hierarchical level, it is possible for the structures to be indicated. If transistor semiconductor components are indicated on a hierarchical level, for example, then the different transistors could all be provided with the label "TRANSISTOR", a sequence index being incremented at the same time. In this way, it is then possible later to distinguish between the different transistors (cf. FIG. 13 and FIG. 14).

Such a technique of propagating labels within a hierarchical level is illustrated in FIG. 9. The blocks from FIG. 9 could be carried out e.g. as part of block 1012 in FIG. 8. In block 1021, firstly a manual annotation of some structures in one or more bricks of the respectively active hierarchical level (cf. FIG. 8: block 1011) is performed.

Block 1021A then involves checking whether the annotation is concluded. If the structures do not yet all have labels, block 1022 is carried out.

In block 1022, a propagation of the labels is carried out, via a propagation algorithm 1016. The propagation algorithm 1016 can include e.g. a pattern comparison and/or an object recognition algorithm. The propagation algorithm 1016 could include a classifier. The propagation algorithm 1016 could use machine learning techniques. It would be possible, for example, for the propagation algorithm 1016 to operate on techniques of threshold value segmentation and with recognition of connected regions. However, more complicated techniques can also be used, for example artificial neural networks with machine learning. The artificial neural networks are particularly robust and can be used flexibly. For example, weights of the artificial neural networks can be trained on the basis of a training data set.

The propagation of the labels can for example also take account of geometric reference data for the structures in the bricks on a common level. This means that it may be possible, on the basis of CAD files or overview images of an optical microscope, for example, to ascertain the relative arrangement of comparable structures and then to take account of this prior knowledge in association with the propagation.

In order to enable an efficient and precise allocation of labels, it is possible to implement a feedback loop with a plurality of iterations 1502 around the propagation of the annotation in block 1022. This is illustrated in FIG. 9 in association with the optional blocks 1023 and 1024.

Block 1023 involves checking whether the annotation on the basis of the propagation in block 1022 of the current iteration 1502 has a sufficient accuracy. For example, it would be possible for specific propagated labels to be presented to the user together with the corresponding structures via a user interface. The user could then specify whether the allocation of labels was appropriate or inappropriate in these cases.

Depending on the corresponding feedback, an adaptation of the propagation algorithm is then optionally carried out in block 1024. In this context, it would be possible to use machine learning techniques, for example backpropagation, in order to adapt weights of an artificial neural network that implements the propagation algorithm 1016. Depending on the adapted propagation algorithm 1016, the propagation of the annotation is then carried out in a renewed iteration 1502 of block 1022.

If the annotation is sufficiently accurate in accordance with the check in block 1023, the propagation of the annotation can be continued in a further iteration 1052, but without carrying out block 1024.

The example from FIG. 9 illustrates interactive online training of the object recognition algorithm 1016, which training is applied while the propagation is carried out. In other examples, however, end-to-end training of the propagation algorithm would also be conceivable. A corresponding example is illustrated in association with FIG. 10.

Figure 10:
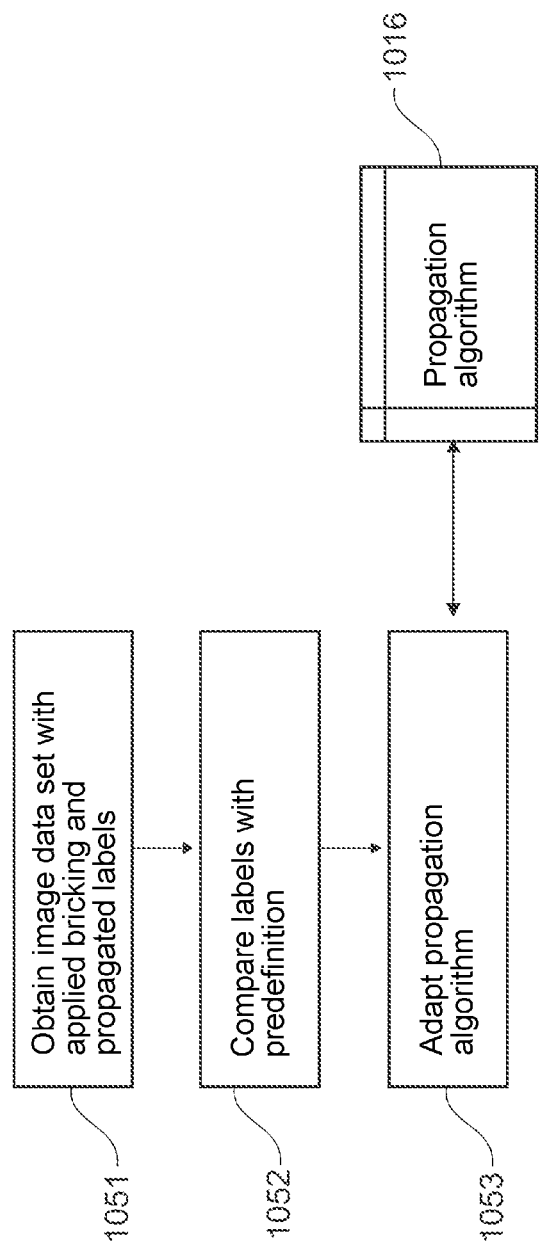
FIG. 10 is a flowchart of an exemplary method.

FIG. 10 illustrates a flowchart of one exemplary method. In this case, block 1051 involves obtaining the 3-D image data set 100 together with applied bricking and labels. That means that the structures contained in the various bricks of the bricking have already been provided with labels, e.g. through the use of the method according to FIG. 9—that is to say with use of the propagation algorithm 1016.

End-to-end training of the propagation algorithm 1016 can then be effected in blocks 1052 and 1053. In the example in FIG. 10, the end-to-end training is thus effected offline, i.e. after the conclusion of the propagation of the labels.

That means that in block 1052 the labels created e.g. via the propagation algorithm 1016 are compared with a reference—e.g. a manual verification. In block 1053, the propagation algorithm is then adapted on the basis of a deviation from block 1052. For the next implementation of the propagation, it is possible to have recourse to the adapted propagation algorithm 1016.

A description has thus been given above of techniques for allocating labels to structures 401-403. For example, a description has been given of techniques for allocating multihierarchical labels 158, 159 to structures in bricks on different hierarchical levels. On account of the large amount of data to be processed, a high degree of automation is desirable when creating the multihierarchical labels 158, 159. A corresponding possibility for efficiently determining the multihierarchical labels 158, 159 is described in association with FIG. 11.

Figure 11:
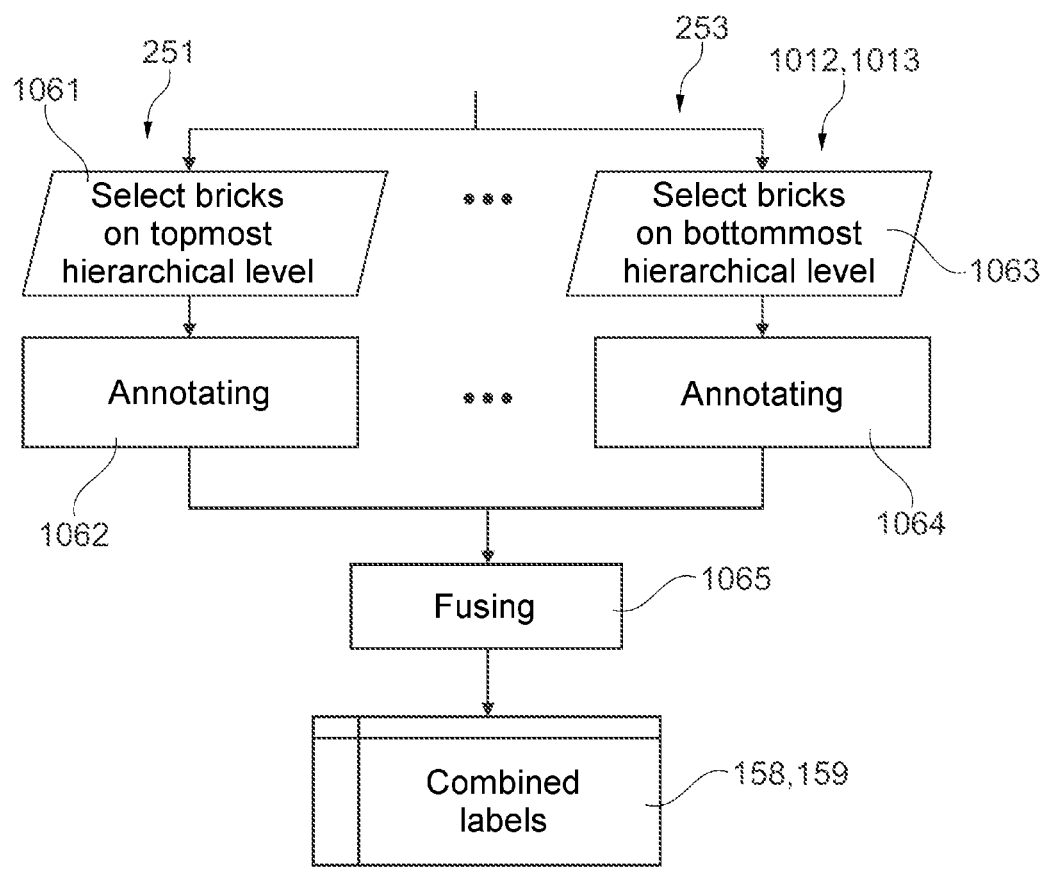
FIG. 11 is a flowchart of one exemplary method.

FIG. 11 is a flowchart of one exemplary method. For example, the method in accordance with FIG. 11 could implement blocks 1012 and 1013 from FIG. 8. FIG. 11 illustrates aspects in association with the determination of labels 151-154 for structures 401-403 and in association with the determination of combined, multihierarchical labels 158, 159.

Block 1061 involves selecting the bricks on the topmost hierarchical level 251. Block 1062 then involves determining label candidates for structures in the bricks on the hierarchical level 251. This can be done partly automatically or fully automatically. For example, a classifier could be used. The classifier can include an object recognition algorithm; the corresponding object recognition algorithm can identify specific probabilities for the classification of the structures. For example, the following could thus be obtained for a specific structure of a brick on the topmost hierarchical level 251 as the result of block 1062: Label "MEMORY": 40%; label "LOGIC ELEMENT": 60%. The label candidates "MEMORY" and "LOGIC ELEMENT" are obtained in this way. Optionally, a propagation of labels on the basis of a manual annotation can also be effected. In any case there is a degree of uncertainty in association with the allocation of the label candidates.

The labels available in principle can be determined e.g. depending on the hierarchical level and the sample type, cf. TAB. 2. That means that on the basis of the respective resolution of the image elements it is possible e.g. to stipulate that only specific semiconductor components—e.g. lines or entire logic groups, etc.—are visible on a higher hierarchical level, while details of the semiconductor components, e.g. individual transistors, etc., are visible on lower hierarchical levels.

Blocks 1061 and 1062 are then carried out in each case for each of the hierarchical levels 251-253 of the bricking 201. In FIG. 11, this is also illustrated for the bottommost hierarchical level 253 in association with blocks 1063 and 1064.

Fusion of the label candidates can then be effected in block 1065. This fusion can firstly make it possible to reduce uncertainties in the determination of the label candidates: that means that from the context information obtained by comparing the label candidates for the structures on different hierarchical levels, a particularly reliable selection from the different label candidates can be effected.

Moreover, in block 1065 it may be possible to determine the multihierarchical labels. To that end, a further classification algorithm can be applied. The latter can obtain as input the label candidates from blocks 1062 and 1064. By way of example, a plausibility check could be carried out. The plausibility check can take account of the context information, e.g. on the basis of a comparison with the database as represented in TAB. 2 (which includes predefined relationships between the structures or for example the semiconductor components on the different hierarchical levels). In this case, the context information describes a relationship between the label candidates of the structures in the different hierarchical levels. If it is known e.g. that "MEMORY" structures do not include "HOLES", then this can be taken into account in the fusion in block 1065. The allocation of the label "LOGIC" may be preferred over the allocation of the label "MEMORY". The further classification algorithm can accordingly be trained to take account of the context information for the labels for structures in the bricks on different hierarchical levels.

It is thus evident in summary from FIG. 11 that firstly label candidates for structures the associated bricks different hierarchical levels are determined via one or more first classification algorithms. It may then be possible to determine the labels for the structures in the associated bricks via a second classification algorithm, which obtains the label candidates as input.

Figure 12:
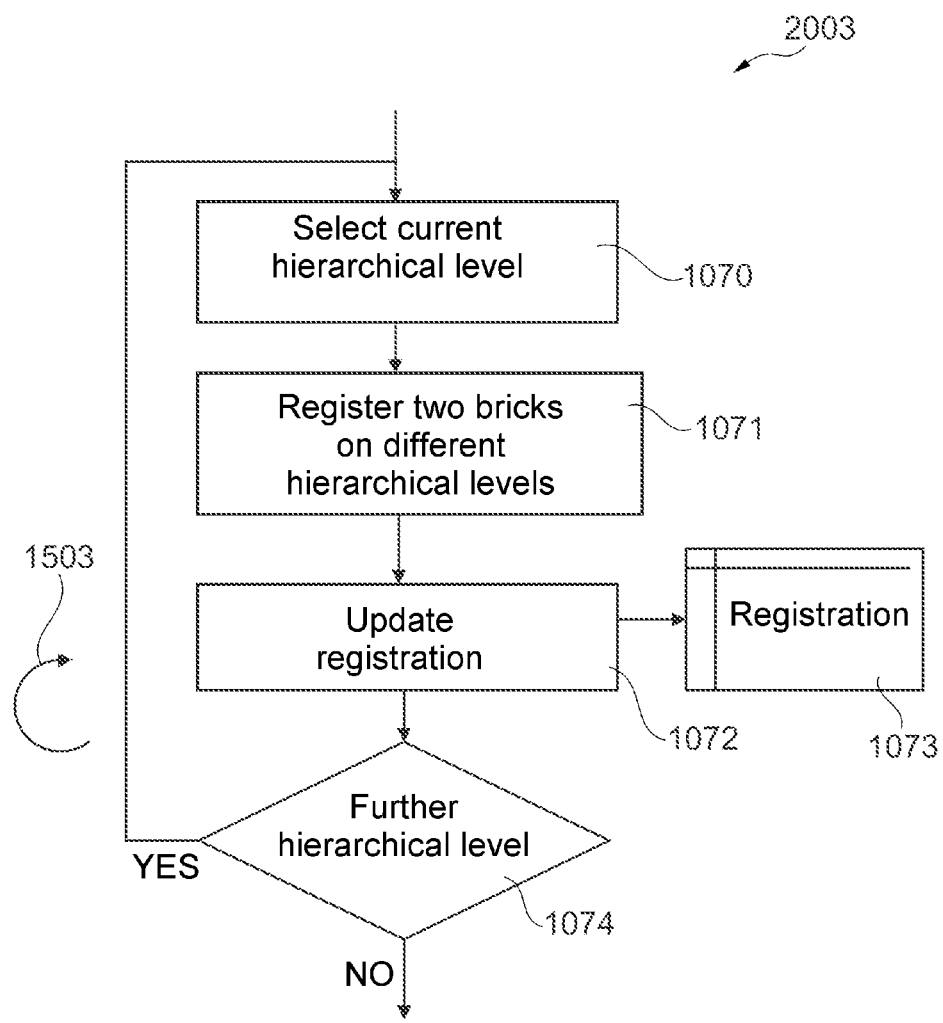
FIG. 12 is a flowchart of one exemplary method.

FIG. 12 is a flowchart of one exemplary method. FIG. 12 illustrates aspects in association with the registration. For example, the method in accordance with FIG. 12 could be carried out in association with block 2003 from FIG. 6.

Firstly, block 1070 involves selecting a current hierarchical level. In this respect, block 1070 thus corresponds for example to block 1011 from FIG. 8.

The registration of two bricks on the current hierarchical level is then effected in block 1071. This means, therefore, that a brick having voxels from the 3-D image data set is compared with a further brick having voxels from a reference data set (for example a CAD model).

Block 1072 then involves refining the previous registration result 1073 on the basis of the registration from block 1071.

Block 1074 involves checking whether there are still bricks to be processed on a further hierarchical level. In this respect, block 1074 corresponds to block 1014 from FIG. 8. If this is the case, then a further iteration 1503 of blocks 1070-1072 is carried out.

The multihierarchical registration from FIG. 12 means, therefore, that the procedure begins on the topmost hierarchical level (first iteration 1503) and two corresponding volumes are registered with one another. A correspondingly coarse registration result is thereby obtained (block 1073). This result of the registration serves as a starting point for a refinement on the next lower hierarchical level in the next iteration 1503. By virtue of two corresponding bricks (which depict corresponding volumes) being selected on this next hierarchical level, the registration can be carried out reliably there. The corresponding bricks can be selected on the basis of the coarse registration on the topmost hierarchical level. This process can be repeated iteratively until the bottommost hierarchical level is reached.

For example, corresponding bricks on the lower hierarchical levels can be selected for the registration depending on a significance of the structures depicted there. For example, such bricks which depict structures which can be registered with one another particularly reliably could thus be selected. These are for example structures having a high aspect ratio or structures having a significant anisotropy in the three spatial directions. Irregular structures may be preferred. The selection can be effected e.g. on the basis of the reference data set. By way of example, such bricks which depict one or more lithography markers could be selected for the registration.

Such a registration can optionally also have recourse to lithography markers as structures. That is based on the insight that semiconductor structures are often fabricated in layer planes. Lithography markers are used for aligning successive layer planes. Such techniques are known in principle. The morphology of lithography markers is typically significantly different than the morphology of semiconductor components or other functional units. The lithography markers can have a strong anisotropy in order to be able to determine the orientation. Such a registration is particularly efficient even for a large number of lithography markers. Even if the position of individual lithography markers may be subjected to random variations, this fluctuation can be averaged out on account of the large number of lithography markers. A particularly precise registration can be made possible in this way, for example in comparison with reference techniques that use only a single lithography marker for registration.

The registration can be carried out separately for at least one layer plane of the semiconductor components. This enables a combination of 1-D/2-D registration techniques in order to obtain a 3-D registration. For example, first a 1-D registration on the layer stack of the semiconductor components could be carried out (e.g. on the basis of a lateral section through the layer stack). This can define the normal to the plane of the layer stack as a registration component. In a second step, the individual layer planes of the semiconductor components can be extracted and registered with one another in order to enable a 2-D registration orthogonally with respect to the normal to the plane.

It goes without saying that the features of the embodiments and aspects of the disclosure described above can be combined with one another. For example, the features can be used not only in the combinations described but also in other combinations or on their own without departing from the scope of the disclosure.

In this regard, e.g. primarily 3-D image data sets representing semiconductor components have been described. However, corresponding techniques can also be applied to other types of 3-D image data sets.

Furthermore, some techniques in association with a 3-D image data set have been described above. However, corresponding techniques can also be applied to 2-D image data sets.

What is claimed is:

1. A method, comprising:
applying a hierarchical bricking to an image data set that depicts semiconductor components, bricking comprising a plurality of bricks on a plurality of hierarchical levels, bricks on different hierarchical levels having different image element sizes of corresponding image elements; and
determining the hierarchical levels and/or edge lengths of the bricks on the plurality of hierarchical levels in accordance with structure sizes of the semiconductor components,
wherein:
the plurality of hierarchical levels comprise a first hierarchical level, a second hierarchical level, and a third hierarchical level;
each image element in the first hierarchical level has a first size;
each image element in the second hierarchical level has a second size;
each image element in the third hierarchical level has a third size;
a ratio of the first size to the second size has a first value;
a ratio of the second size to the third size has a second value;
the second value is different from the first value; and
one of the following holds:

i) for each of the image elements, the image element comprises a pixel and the corresponding image elements comprise corresponding pixels; or ii) for each of the image elements, the image element comprises a voxel and the corresponding image elements comprise corresponding voxels.

2. The method of claim 1, further comprising:
using an imaging device to acquire the image data set; and
obtaining the image data set from the imaging device.

3. The method of claim 1, wherein the image data set comprises a three-dimensional image data set.

4. The method of claim 1, further comprising determining the image element sizes and/or an image element number of the image elements of the bricks on the plurality of hierarchical levels in accordance with structure sizes of the semiconductor components.

5. The method of claim 1, further comprising looking up the structure sizes of the semiconductor components in a database depending on a sample type of a sample depicted by the image data set.

6. The method of claim 1, further comprising allocating labels to structures in the bricks on the plurality of hierarchical levels.

7. The method of claim 6, wherein:
for structures in a brick on a lower hierarchical level of the bricking, a label is allocated on the basis of context information; and
the context information takes account of a predefined relationship between the structures corresponding to the semiconductor components in the brick on the lower hierarchical level and further structures corresponding to the semiconductor components in a further brick on an upper hierarchical level.

8. The method of claim 7, wherein the predefined relationship is based on geometric reference data for the semiconductor components in the lower hierarchical level and in the upper hierarchical level.

9. The method of claim 6, wherein:
the labels of the structures in bricks on a lower hierarchical level are selected from a first candidate set comprising geometric basic forms; and
the labels of the structures in bricks on an upper hierarchical level are selected from a second candidate set comprising a comprehensive overview of the semiconductor components, a logic group having a plurality of semiconductor components, interconnects, and/or lithography markers.

10. The method of claim 6, wherein allocating the labels comprises, for structures in a brick on a lower hierarchical level, inheriting labels from one or more structures in a further brick on an upper hierarchical level, the further brick being associated with the brick on the lower hierarchical level, to obtain a multihierarchical label for the structures in the brick on in the lower hierarchical level.

11. The method of claim 6, wherein allocating the labels comprises automatic or partially supervised propagation of labels between structures in bricks on a common hierarchical level.

12. The method of claim 11, wherein propagating is effected based on geometric reference data for the semiconductor components in the bricks on the common level.

13. The method of claim 11, wherein:
propagating is based on a machine-learned propagation algorithm; and
the method further comprises end-to-end training of the propagation algorithm or iterative online training of the propagation algorithm.

14. The method of claim 6, wherein allocating the labels comprises:
determining label candidates for structures in associated bricks of different hierarchical levels via one or a plurality of first classification algorithms; and
determining the labels for the structures in the associated bricks via a second classification algorithm, which obtains the label candidates as input.

15. The method as claimed in claim 14, wherein:
the second classification algorithm compares the label candidates of the structures in the associated bricks of different hierarchical levels with one another to obtain context information for the structures; and
the second classification algorithm plausibilizes the context information on the basis of a predefined relationship between structures on different hierarchical levels and determines the labels on the basis of the plausibilizing.

16. The method of claim 6, wherein at least one of the following hold:
the labels classify the structures in at least one class;
the labels segment the structures in the image space; and
the labels provide the structures with a bounding box.

17. The method of claim 6, further comprising controlling a human-machine interface to navigate through the image data set on the basis of the labels.

18. The method of claim 1, further comprising performing an anomaly detection to recognize unknown structures in the bricks of different hierarchical levels.

19. The method of claim 1, further comprising registering structures in the bricks on the plurality of hierarchical levels in each case with reference bricks of the corresponding hierarchical level.

20. The method of claim 1, further comprising discarding at least some bricks on a hierarchical level depending on redundancies in depicted structures.

21. One or more machine-readable hardware storage devices comprising instructions that are executable by one or more processing devices to perform operations comprising the method of claim 1.

22. A system comprising:
one or more processing devices; and
one or more machine-readable hardware storage devices comprising instructions that are executable by the one or more processing devices to perform operations comprising the method of claim 1.

23. The method of claim 1, wherein, for each of the image elements, the image element comprises a pixel, and the corresponding image elements comprise corresponding pixels.

24. The method of claim 1, wherein, for each of the image elements, the image element comprises a voxel, and the corresponding image elements comprise corresponding voxels.

* * * * *

UNITED STATES PATENT AND TRADEMARK OFFICE
CERTIFICATE OF CORRECTION

| | | |
|---|---|---|
| PATENT NO. | : 12,175,650 B2 | Page 1 of 1 |
| APPLICATION NO. | : 17/388589 | |
| DATED | : December 24, 2024 | |
| INVENTOR(S) | : Jens Timo Neumann et al. | |

It is certified that error appears in the above-identified patent and that said Letters Patent is hereby corrected as shown below:

In the Specification

Column 13, Line 63, delete "hole)." insert -- hole. --.

Signed and Sealed this
Eleventh Day of March, 2025

Coke Morgan Stewart
*Acting Director of the United States Patent and Trademark Office*